(12) United States Patent
Shimada et al.

(10) Patent No.: US 6,603,524 B1
(45) Date of Patent: Aug. 5, 2003

(54) LCD DEVICE HAVING PIXEL ELECTRODES ASYMMETRICALLY OVERLAPPING GATE AND/OR SOURCE SIGNAL LINES

(75) Inventors: Yoshinori Shimada, Yamatokoriyama (JP); Hiroyuki Ohgami, Tenri (JP); Takayuki Shimada, Yamatokoriyama (JP); Yoshikazu Sakuhana, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/521,199

(22) Filed: Mar. 7, 2000

Related U.S. Application Data

(62) Division of application No. 08/904,687, filed on Aug. 1, 1997, now Pat. No. 6,147,722.

(30) Foreign Application Priority Data

| Aug. 5, 1996 | (JP) | 8-206228 |
| Nov. 26, 1996 | (JP) | 8-315285 |
| May 7, 1997 | (JP) | 9-117302 |

(51) Int. Cl.[7] ............................................ G02F 1/1343
(52) U.S. Cl. .................................. 349/139; 349/129
(58) Field of Search .............................. 349/38, 39, 129, 349/139, 122, 138

(56) References Cited

U.S. PATENT DOCUMENTS

| 5,345,324 A | * 9/1994 | Koseki et al. ............... 349/111 |
| 5,585,951 A | 12/1996 | Noda et al. |
| 5,641,974 A | 6/1997 | Den Boer et al. |
| 5,682,211 A | 10/1997 | Yao et al. |
| 5,721,601 A | 2/1998 | Yamaji et al. |
| 5,784,132 A | 7/1998 | Hashimoto |
| 5,822,027 A | 10/1998 | Shimada et al. |
| 5,844,641 A | * 12/1998 | Jun et al. ........................ 349/38 |
| 5,852,488 A | * 12/1998 | Takemura ..................... 349/187 |
| 5,936,685 A | * 8/1999 | Ito et al. ......................... 349/38 |
| 6,011,604 A | * 1/2000 | Miyazawa ..................... 349/110 |

FOREIGN PATENT DOCUMENTS

| JP | 3-96919 | 4/1991 |
| JP | 3-150532 | 6/1991 |
| JP | 4-322218 | 11/1992 |
| JP | 5-34679 | 2/1993 |
| JP | 04016690 | * 8/1993 |
| JP | 5-249494 | 9/1993 |
| JP | 5-265046 | 10/1993 |
| JP | 6-34965 | 2/1994 |
| JP | 6-130415 | 5/1994 |
| JP | 06-160900 | * 6/1994 |
| JP | 6-160900 | 6/1994 |
| JP | 7-301814 | * 11/1995 |

OTHER PUBLICATIONS

Partial Translation of Japanese Laid–Open Publication No. 6–160900, Laid–Open Publication Date Jun. 7, 1994, pp. 1–7.

* cited by examiner

Primary Examiner—Kenneth Parker
(74) Attorney, Agent, or Firm—Nixon & Vanderhye, P.C.

(57) ABSTRACT

The liquid crystal display device of this invention includes: gate signal lines; source signal lines crossing the gate signal lines; an interlayer insulating film formed on the gate signal lines and the source signal lines; and pixel electrodes formed on the interlayer insulating film, wherein a first pixel electrode and a second pixel electrode adjacent to each other at both sides of the gate signal line partially overlap the gate signal line sandwiched by the first pixel electrode and the second pixel electrode, and an overlap width of the first pixel electrode on the gate signal line is different from an overlap width of the second pixel electrode on the gate signal line.

17 Claims, 28 Drawing Sheets

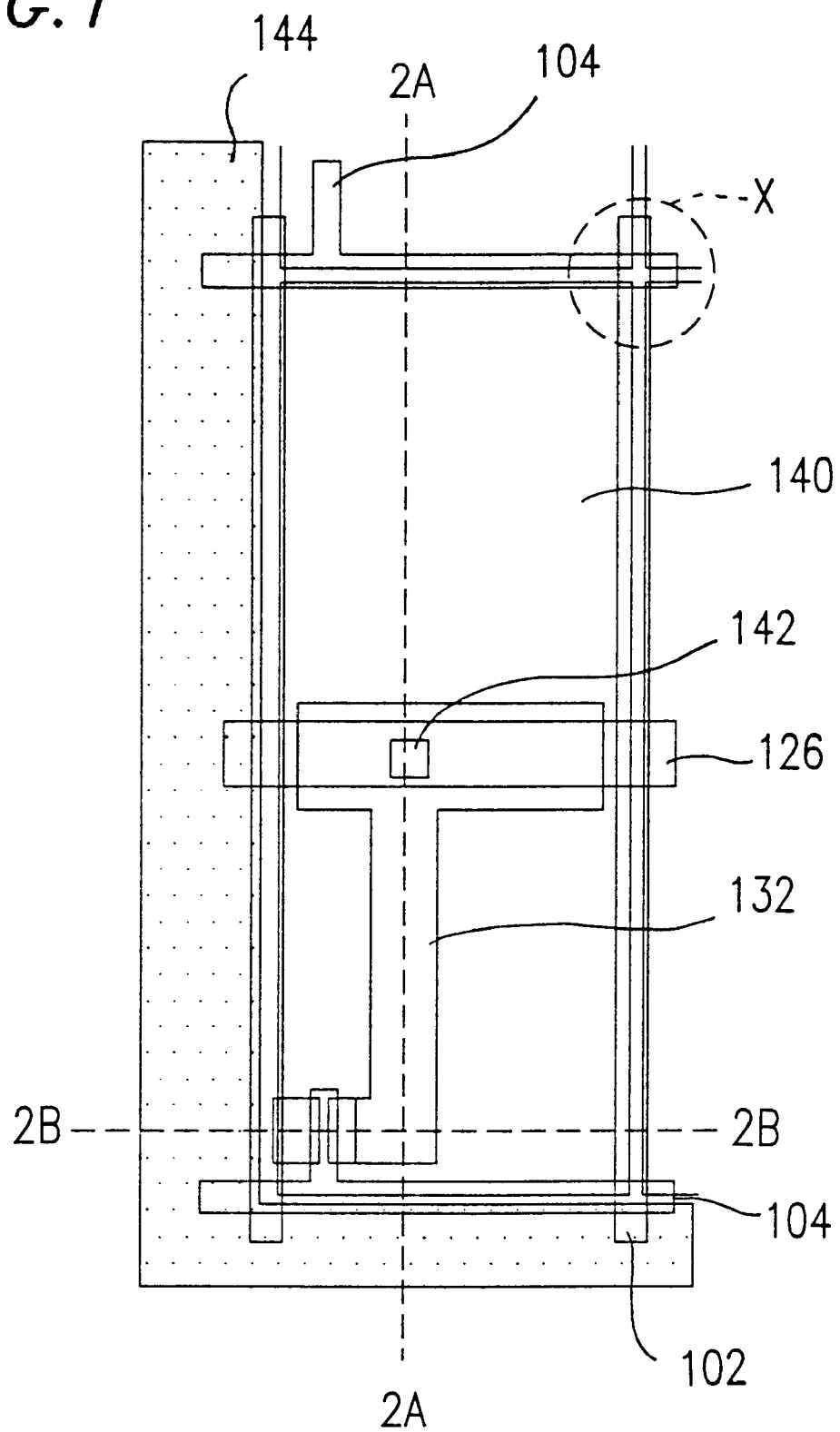

| + | − | + | − | + | − |
| − | + | − | + | − | + |
| + | − | + | − | + | − |
| − | + | − | + | − | + |

LCD DEVICE HAVING PIXEL ELECTRODES ASYMMETRICALLY OVERLAPPING GATE AND/OR SOURCE SIGNAL LINES

This is a divisional of application Ser. No. 08/904,687, filed Aug. 1, 1997, now U.S. Pat. No. 6,147,722, the entire content of which is hereby incorporated by reference in this application.

BACKGROUND OF THE INVENTION

1. Field of the Invention

The present invention relates to a liquid crystal display device used for display sections of computers and OA apparatuses and the like. More specifically, the present invention relates to a liquid crystal display device which has excellent display characteristics and a high aperture ratio.

2. Description of the Related Art

Conventionally, a liquid crystal display device using an active matrix substrate is known as a display device for computers and OA apparatuses. An example of such a liquid crystal display device using an active matrix substrate is shown in FIG. 26. The active matrix substrate in this example has thin film transistors (hereinbelow referred to as TFTs) as switching elements.

Referring to FIG. 26, TFTs 106 and pixel capacitors 108 are formed in a matrix on a substrate made of glass or the like. A gate electrode of each TFT 106 is connected to a corresponding gate signal line 104, so that the TFT 106 is switched on and off in response to a signal input into the gate electrode via the gate signal line 104. A source electrode of the TFT 106 is connected to a corresponding source signal line 102, so that a video signal is input into the TFT 106. A drain electrode of the TFT 106 is connected to a pixel electrode and one terminal of the corresponding pixel capacitor 108. The other terminal of the pixel capacitor 108 is connected to a corresponding pixel capacitor line 110 and also connected to a counter electrode provided on a substrate facing the active matrix substrate.

FIG. 27 is a plan view of such an active matrix substrate, FIG. 28 is a sectional view taken along line 28—28 of FIG. 27, and FIG. 29 is a sectional view taken along line 29—29 of FIG. 27.

Referring to FIGS. 27 and 28, each pixel of the liquid crystal display device includes the TFT 106 (see FIG. 26), an extended drain electrode 125, a storage capacitor electrode 126, and a pixel electrode 140. Referring to FIG. 29, for each pixel, the gate signal line 104 together with the gate electrode, a gate insulating film 103, a semiconductor layer 134, a channel protection layer 128, an n$^+$-Si layer 130 and an ITO (indium tin oxide) film 132 which together constitute the source and drain electrodes, the source signal line 102 made of a metal layer, an interlayer insulating film 136, and the pixel electrode 140 made of a transparent conductive layer are formed in this order on a transparent insulating substrate 120, to form the active matrix substrate. The pixel electrode 140 is connected to the drain electrode of the TFT 106 via a contact hole 142 (see FIG. 28) formed through the interlayer insulating film 136. FIGS. 28 and 29 also show a substrate 122 provided to face the active matrix substrate with a liquid crystal layer 112 interposed therebetween.

In the active matrix substrate with the above configuration, the interlayer insulating film 136 is formed between the gate signal line 104 or the source signal line 102 and the pixel electrode 140. This allows the periphery of the pixel electrode 140 to overlap the signal lines 102 and 104. As a result, a liquid crystal display device with a high aperture ratio can be obtained. Moreover, the overlapping pixel electrode 140 shields an electric field generated due to the potential at the signal lines, effectively suppressing failure in the orientation of liquid crystal molecules.

Referring to FIGS. 28 and 29, a light-shading layer 144, and color layers 146 exhibiting red, blue, or green constituting a color filter are formed on the substrate 122 facing the active matrix substrate with the liquid crystal layer 112 therebetween. A counter electrode 148 and an alignment film 150 are formed in this order on the color filter. Another alignment film 150 is formed on the surface of the active matrix substrate in contact with the liquid crystal layer 112.

FIG. 30A is an enlarged plan view of a portion of FIG. 27 where the gate signal line 104 and the source signal line 102 cross each other. FIG. 30B is a sectional view taken along line 30B—30B of FIG. 30A, showing the overlap portions of the pixel electrodes 140 on the source signal line 102.

Referring to FIG. 30A, the vertically adjacent pixel electrodes 140 overlap the corresponding gate signal line 104 by overlap widths dg1 and dg2, while the horizontally adjacent pixel electrodes 140 overlap the corresponding source signal line 102 by overlap widths ds1 and ds2. These overlap widths are generally determined in consideration of the processing precision of the gate signal lines 104 and the source signal lines 102 which serve as light-shading films, the overlap precision of the pixel electrodes 140 on the gate signal lines 104 and the source signal lines 102, and the processing precision of the pixel electrodes 140. Conventionally, the pixel electrodes 140 overlap the gate signal lines 104 and the source signal lines 102 so that the overlap widths dg1 and dg2 are equal to each other and the overlap widths ds1 and ds2 are equal to each other.

The liquid crystal display device where the pixel electrodes overlap the signal lines as described above causes no problem as far as it is driven by a flame inversion driving method. However, when such a liquid crystal display device is driven by a gate line inversion driving method, a source line inversion driving method, or a dot inversion driving method, the following problem arises. That is, referring now to FIG. 30B, the orientation of liquid crystal molecules 152$a$ is disturbed due to an electric field generated between the adjacent pixel electrodes, generating a reverse tilt domain having liquid crystal molecules 152$b$ which have a reverse pretilt angle, i.e., are oriented in the opposite direction of an orientation direction D$_1$ (see FIG. 30A) of the liquid crystal molecules 152$a$. The generation of such a reverse tilt domain causes light leakage and thus eminently degrades the display characteristics of the resultant liquid crystal display device.

In order to prevent light leakage of the liquid crystal display device due to the disturbance of the orientation of liquid crystal molecules, increasing the overlap widths of the pixel electrodes on the gate signal lines and the source signal lines is known. Increasing the overlap widths, however, causes another problem of increasing the occupation of the light-shading portions in the liquid crystal display device and thus decreasing the aperture ratio.

Also known is a liquid crystal display device where each pixel is divided into two portions having different orientation directions D$_2$ and D$_2$ of liquid crystal molecules as shown in FIGS. 31A to 31C. FIG. 31A is a plan view of a portion of such a liquid crystal display device where a gate signal line 104 and a source signal line 102 cross each other. FIG. 31B is a sectional view taken along line 31B—31B of FIG. 31A, and FIG. 31C is a sectional view taken along line 31C—31C of FIG. 31A.

In such a liquid crystal display device, also, pixel electrodes conventionally overlap signal lines so that overlap widths dg1 and dg2 are equal to each other and overlap widths. ds1 and ds2 are equal to each other as shown in FIG. 31A. This causes no problem as far as the liquid crystal display device is driven by a flame inversion driving method. However, as in the above case, when it is driven by a gate line inversion driving method, a source line inversion driving method, or a dot inversion driving method, the following problem arises. That is, the orientation of liquid crystal molecules 152a are disturbed due to an electric field generated between the adjacent pixel electrodes, generating a reverse tilt domain having liquid crystal molecules 152b which have a reverse pretilt angle as shown in FIGS. 31B and 31C. This causes light leakage and thus eminently degrades the display characteristics of the resultant liquid crystal display device.

In this case, as in the above case, the overlap widths of the pixel electrodes on the gate signal lines and the source signal lines may be increased to prevent light leakage due to the disturbance of the orientation of liquid crystal molecules. However, this causes another problem of increasing the occupation of the light-shading portions in the liquid crystal display device and thus decreasing the aperture ratio.

Referring to FIGS. 27 and 28 again, a reverse tilt domain is also generated in a region at and around each contact hole 142 as indicated by the reference numeral 154. Such a reverse tilt domain tends to be generated especially when the angle of the inner wall of the contact hole 142 with respect to the substrate surface exceeds 45°. Light leakage may occur even when the liquid crystal layer 112 is switched from a light-transmitting state to a light-shading state.

In order to prevent light leakage at and around the contact hole, it is known to shade the region at and around the contact hole 142 by using a light-shading material for the storage capacitor electrode 126 above which the contact hole 142 is formed. For complete light-shading, however, the size of the storage capacitor electrode 126 needs to be sufficiently large. This causes a problem of substantially decreasing the display area of each pixel and thus decreasing the aperture ratio of the resultant liquid crystal display device.

Japanese Laid-open Patent Publication No. 5-249494 discloses a method for suppressing the generation of a reverse tilt domain in an active matrix liquid crystal display device. In the disclosed method, the angles of sloped steps between pixel electrodes and gate and source signal lines with respect to a substrate surface are set at 60° or less, thereby preventing a generation of disclination lines on a display screen.

According to the above method, however, as described in the Publication, a satisfactory result is not obtainable when the difference between the pixel electrodes and the gate and signal lines exceeds 2 $\mu$m. As for the contact hole 142 shown in FIG. 28, for example, a reverse tilt domain is generated at and around the contact hole 142 when the difference (corresponding to the thickness of the interlayer insulating film 136) exceeds 2 $\mu$m. Therefore, in order to apply the disclosed method to the contact hole 142, the thickness of the interlayer insulating film 136 should be 2 $\mu$m or less.

The interlayer insulating film 136, on the other hand, needs to be sufficiently thick to have a flat surface, which is required to flatten the alignment film 150 to be formed above the interlayer insulating film 136 in contact with the liquid crystal layer 112. Accordingly, it is substantially difficult to set the thickness of the interlayer insulating film 136 at 2 $\mu$m or less. The above disclosed method is therefore not applicable to the region including the contact hole.

SUMMARY OF THE INVENTION

The liquid crystal display device of this invention includes: gate signal lines; source signal lines crossing the gate signal lines; an interlayer insulating film formed on the gate signal lines and the source signal lines; and pixel electrodes formed on the interlayer insulating film, wherein a first pixel electrode and a second pixel electrode adjacent to each other at both sides of the gate signal line partially overlap the gate signal line sandwiched by the first pixel electrode and the second pixel electrode, and an overlap width of the first pixel electrode on the gate signal line is different from an overlap width of the second pixel electrode on the gate signal line.

In one embodiment of the invention, the first pixel electrode is located downstream of a direction of a pretilt angle of liquid crystal molecules with respect to the gate-signal line and the second pixel electrode is located upstream of the direction of the pretilt angle of liquid crystal molecules, and the overlap width of the first pixel electrode on the gate signal line is larger than the overlap width of the second pixel electrode on the gate signal line.

In another embodiment of the invention, the liquid crystal display device is driven by a gate line inversion driving method.

Alternatively, the liquid crystal display device of this invention includes: gate signal lines; source signal lines crossing the gate signal lines; an interlayer insulating film formed on the gate signal lines and the source signal lines; and pixel electrodes formed on the interlayer insulating film, wherein a third pixel electrode and a fourth pixel electrode adjacent to each other at both sides of the source signal line partially overlap the source signal line sandwiched by the third pixel electrode and the fourth pixel electrode, and an overlap width of the third pixel electrode on the source signal line is different from an overlap width of the fourth pixel electrode on the source signal line.

In one embodiment of the invention, the third pixel electrode is located downstream of a direction of a pretilt angle of liquid crystal molecules with respect to the source signal line and the fourth pixel electrode is located upstream of the direction of the pretilt angle of liquid crystal molecules, and the overlap width of the third pixel electrode on the source signal line is larger than the overlap width of the fourth pixel electrode on the source signal line.

In another embodiment of the invention, the liquid crystal display device is driven by a source line inversion driving method.

Alternatively, the liquid crystal display device of this invention includes: gate signal lines; source signal lines crossing the gate signal lines; an interlayer insulating film formed on the gate signal lines and the source signal lines; and pixel electrodes formed on the interlayer insulating film, wherein a first pixel electrode and a second pixel electrode adjacent to each other at both sides of the gate signal lines partially overlap the gate signal line sandwiched by the first pixel electrode and the second pixel electrode, an overlap width of the first pixel electrode on the gate signal line is different from an overlap width of the second pixel electrode on the gate signal line, a third pixel electrode and a fourth pixel electrode adjacent to each other at both sides of the source signal lines partially overlap the source signal line sandwiched by the third pixel electrode and the fourth pixel electrode, and an overlap width of the third pixel electrode on the source signal line is different from an overlap width of the fourth pixel electrode on the source signal line.

In one embodiment of the invention, the first pixel electrode is located downstream of a direction of a pretilt angle of liquid crystal molecules with respect to the gate signal line and the second pixel electrode is located upstream of the direction of the pretilt angle of liquid crystal molecules, and the overlap width of the first pixel electrode on the gate signal line is larger than the overlap width of the second pixel electrode on the gate signal line, and the third pixel electrode is located downstream of a direction of a pretilt angle of liquid crystal molecules with respect to the source signal line and the fourth pixel electrode is located upstream of the direction of the pretilt angle of liquid crystal molecules, and the overlap width of the third pixel electrode on the source signal line is larger than the overlap width of the fourth pixel electrode on the source signal line.

In another embodiment of the invention, the liquid crystal display device is driven by a dot inversion driving method.

Alternatively, the liquid crystal display device of this invention includes: gate signal lines; source signal lines crossing the gate signal lines; an interlayer insulating film formed on the gate signal lines and the source signal lines; and pixel electrodes formed on the interlayer insulating film, wherein each of the pixel electrodes has a first region and a second region which are adjacent to each other and have different orientation directions of liquid crystal molecules, the first region and the second region of each pixel electrode partially overlap at least one signal line of the gate signal line and the source signal line, an overlap width of the first region on the signal line is different from an overlap width of the second region on the signal line, and a boundary of the first region and the second region is covered with a light-shading film which crosses the signal line.

In one embodiment of the invention, the signal line is the source signal line, the source signal line is located downstream of a direction of a pretilt angle of liquid crystal molecules in the first region, the source signal line is located upstream of the direction of the pretilt angle of liquid crystal molecules in the second region, and the overlap width of the second region on the source signal line is larger than the overlap width of the first region on the source signal line.

In another embodiment of the invention, the signal line is substantially linear, and an edge of the first region of the pixel electrode overlapping the signal line is offset from an edge of the second region overlapping the signal line.

In still another embodiment of the invention, an end of a portion of the signal line which is overlapped by the first region is offset from an end of a portion of the signal line which is overlapped by the second region, and an edge of the first region overlapping the signal line is aligned with an edge of the second region over-lapping the signal line.

In still another embodiment of the invention, the liquid crystal-display device is driven by a source line inversion driving method or a dot inversion driving method.

Alternatively, the liquid crystal display device of this invention includes: gate signal lines; source signal lines crossing the gate signal lines; an interlayer insulating film formed on the gate signal lines and the source signal lines; pixel electrodes formed on the interlayer insulating film; and drain electrodes connected to the corresponding pixel electrodes via contact holes formed through the interlayer insulating film, wherein each of the contact holes is formed above a light-shading signal line located under the corresponding drain electrode, and a center axis of the contact hole is offset from a center axis of the light-shading signal line.

In one embodiment of the invention, the center axis of the contact hole is offset from the center axis of the light-shading signal line in a direction of a pretilt angle of liquid crystal molecules by a distance.

In another embodiment of the invention, the distance between the center axis of the contact hole and the center axis of the light-shading signal line is in a range of about 0.5 to about 1.5 $\mu$m.

In still another embodiment of the invention, a gate electrode of each of switching elements is disposed in the center of the corresponding pixel electrode, and the light-shading signal line is disposed between the pixel electrode and a pixel electrode adjacent in a direction opposite to a direction of a pretilt angle of liquid crystal molecules.

In still another embodiment of the invention, the light-shading signal line constitutes a gate electrode of each of the switching elements, and the gate electrode is disposed between the pixel electrode and a pixel electrode adjacent in a direction opposite to a direction of a pretilt angle of liquid crystal molecules.

Thus, according to one embodiment of the liquid crystal display device of the present invention, the overlap width of the first pixel electrode on the gate signal line is different from that of the second pixel electrode on the gate signal line. Typically, it is designed that the overlap width of the first pixel electrode on the gate signal line is larger than the overlap width of the second pixel electrode on the gate signal line. In a liquid crystal display device employing the gate line inversion driving method, a reverse tilt domain tends to be generated in the overlap portion of the first pixel electrode of the two pixel electrodes sandwiching each gate signal line which is located downstream of the direction of the pretilt angle (orientation direction) of liquid crystal molecules. In the liquid crystal display device of this embodiment, a reverse tilt domain generated due to an electric field generated between adjacent pixel electrodes can be covered with the overlap portion of the first pixel electrode on the gate signal line with a large overlap width. Thus, the liquid crystal display device of this embodiment can prevent light leakage due to the generation of a reverse tilt domain when it is driven by the gate line inversion method, while it holds a high aperture ratio.

According to another embodiment of the liquid crystal display device of the present invention, the overlap width of the third pixel electrode on the source signal line is different from that of the fourth pixel electrode on the source signal line. Typically, it is designed that the overlap width of the third pixel electrode on the source signal line is larger than the overlap width of the fourth pixel electrode on the source signal line. In a liquid crystal display device employing the source line inversion driving method, a reverse tilt domain tends to be generated in the overlap portion of the third pixel electrode of the two pixel electrodes sandwiching each source signal line which is located downstream of the direction of the pretilt angle (the orientation direction) of liquid crystal molecules. In the liquid crystal display device of this embodiment, a reverse tilt domain generated due to an electric field generated between adjacent pixel electrodes can be covered with the overlap portion of the third pixel electrode on the source signal line with a large overlap width. Thus, the liquid crystal display device of this embodiment can prevent light leakage due to the generation of a reverse tilt domain when it is driven by the source line inversion method, while it holds a high aperture ratio.

According to still another embodiment of the liquid crystal display device of the present invention, the overlap width of the first pixel electrode on the gate signal line is different from that of the second pixel electrode on the gate signal line, and the overlap width of the third pixel electrode on the source signal line is different from that of the fourth pixel electrode on the source signal line. Typically, it is designed that the overlap width of the first pixel electrode on the gate signal line is larger than the overlap width of the second pixel electrode on the gate signal line and that the overlap width of the third pixel electrode on the source signal line is larger than the overlap width of the fourth pixel electrode on the source signal line. In a liquid crystal display device employing the dot inversion driving method, reverse tilt domains tend to be generated in the overlap portion of the first pixel electrode of the two pixel electrodes sandwiching each gate signal line which is located downstream of the direction of the pretilt angle (orientation direction) of liquid crystal molecules, and the overlap portion of the third pixel electrode of the two pixel electrodes sandwiching each source signal line which is located downstream of the direction of the pretilt angle (orientation direction) of liquid crystal molecules. In the liquid crystal display device of this embodiment, reverse tilt domains generated due to an electric field generated between adjacent pixel electrodes can be covered with the overlap portion of the first pixel electrode on the gate signal line with a large overlap width and the overlap portion of the third pixel electrode on the source signal line with a large overlap width. Thus, the liquid crystal display device of this embodiment can prevent light leakage due to the generation of reverse tilt domains when it is driven by the dot inversion method, while it holds a high aperture ratio.

According to still another embodiment of the liquid crystal display device of the present invention, each pixel electrode has adjacent first and second regions having different orientation directions of liquid crystal molecules. The overlap width of the first region on a signal line is different from that of the second region on the signal line. The boundary of the first and second regions is covered with a light-shading film which is formed to cross the signal line. For example, assume that the first and second regions of the pixel electrode overlap a source signal line, and the source signal line is located downstream of the direction of the pretilt angle (orientation direction) of liquid crystal molecules in the first region with respect to the first region, while the source signal line is located upstream of the direction of the pretilt angle of liquid crystal molecules in the second region with respect to the second region. In this case, a reverse tilt domain is generated in the second region on the side of the source signal line. According to the present invention, it is typically designed that the overlap width of the second region on the source signal line is larger than the overlap width of the first region on the source signal line. With this arrangement, a reverse tilt domain generated in the overlap portion on the source signal line can be well shaded from light by the wide overlap portion. Also, since the boundary of the first and second regions is covered with a light-shading film, light leakage from the boundary can be prevented.

According to still another embodiment of the liquid crystal display device of the present invention, each contact hole is covered with a light-shading signal line underlying a drain electrode, and the center axis of the contact hole does not correspond with the center axis of the light-shading signal line. Typically, the center axis of each contact hole is offset from the center axis of the light-shading signal line in the direction of the pretilt angle of liquid crystal molecules. Accordingly, a reverse tilt domain generated at and around the contact hole is completely covered with the light-shading signal line. Thus, the liquid crystal display device of this embodiment can prevent light leakage due to the generation of a reverse tilt domain while it holds a high aperture ratio.

Thus, the invention described herein makes possible the advantages of: (1) providing a liquid crystal display device with a high aperture ratio which can prevent light leakage caused by the generation of a reverse tilt domain between a gate signal line and a pixel electrode and/or between a source signal line and the pixel electrode; (2) providing a liquid crystal display device with a high aperture ratio which can prevent light leakage caused by the generation of a reverse tilt domain even if any of the gate line inversion driving method, the source line inversion driving method, and the dot inversion driving method are employed; and (3) providing a liquid crystal display device with a high aperture ratio which can prevent light leakage caused by the generation of a reverse tilt domain at and around a contact hole irrespective of the thickness of the interlayer insulating film.

These and other advantages of the present invention will become apparent to those skilled in the art upon reading and understanding the following detailed description with reference to the accompanying figures.

BRIEF DESCRIPTION OF THE DRAWINGS

FIG. 1 is a plan view of one pixel of a liquid crystal display device of one embodiment according to the present invention.

DESCRIPTION OF THE PREFERRED EMBODIMENTS

Figure 2A:
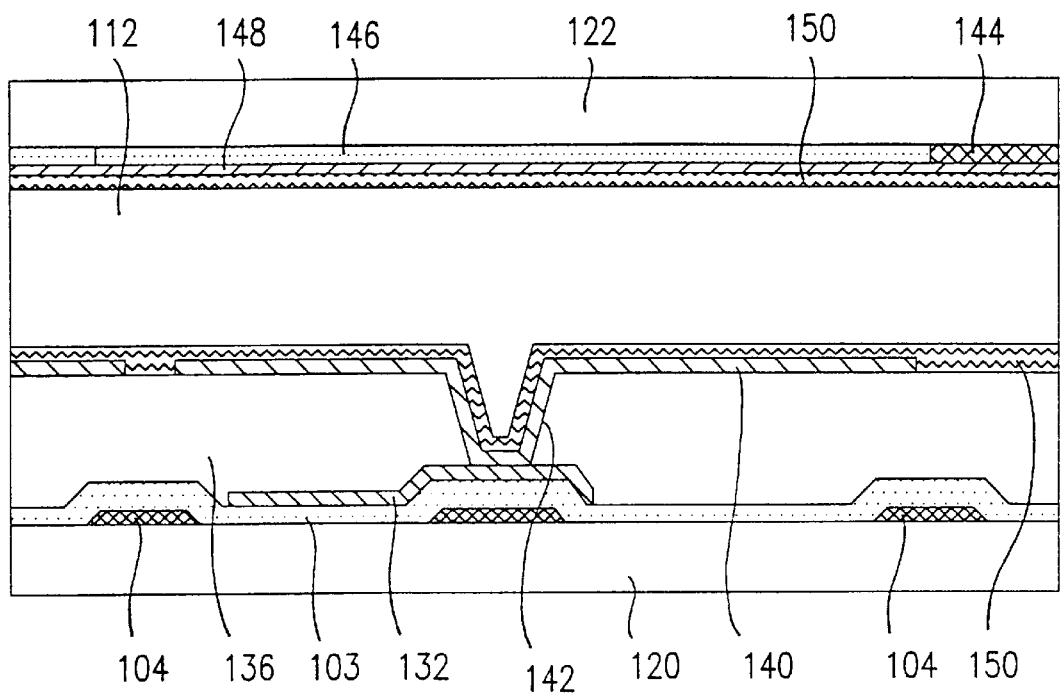
FIG. 2A is a sectional view of the liquid crystal display device, taken along line 2A—2A of FIG. 1.

Hereinbelow, the present invention will be described by way of illustrative, but in no way restrictive examples with reference to the accompanying drawings. In the drawings, components having the same functions are denoted by the same reference numerals.

EXAMPLE 1

Figure 2B:
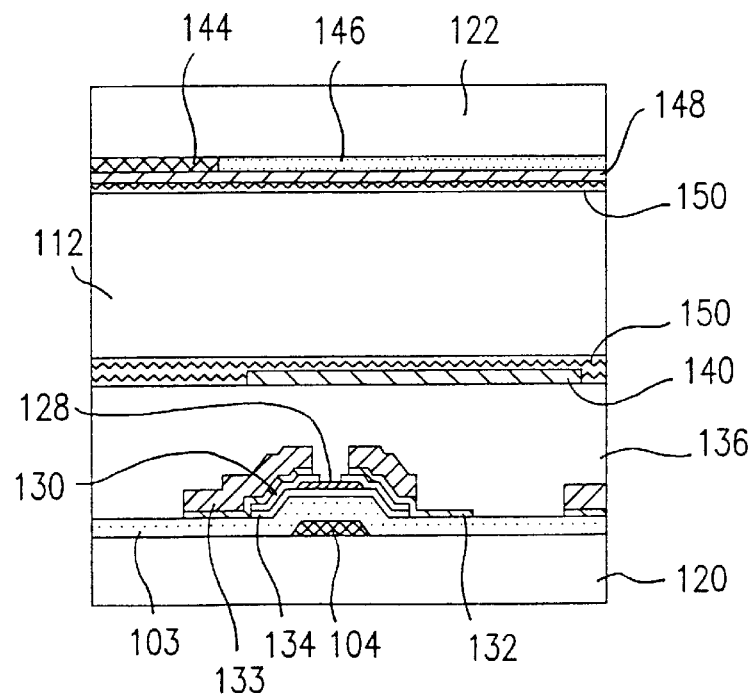
FIG. 2B is a sectional view of the liquid crystal display device, taken along line 2B—2B of FIG. 1.
Figure 3A:
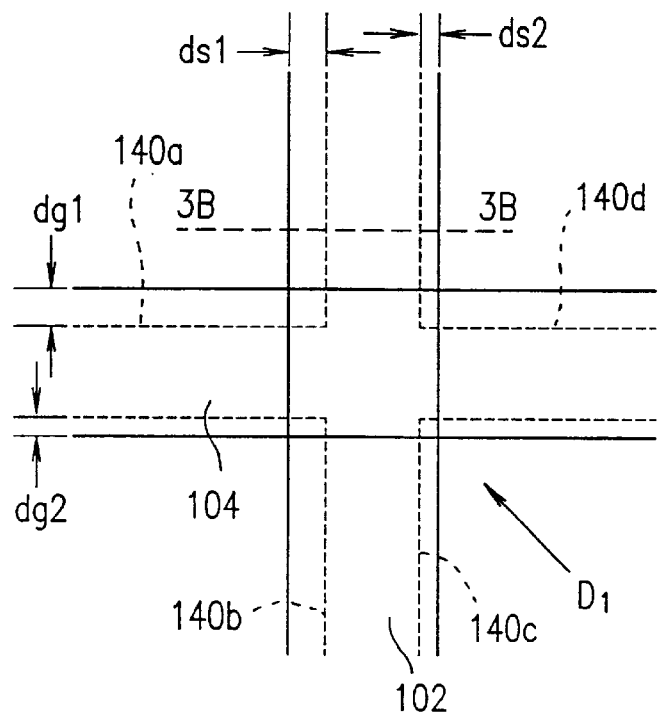
FIG. 3A is an enlarged plan view of a region X in FIG. 1 where a gate signal line and a source signal line cross each other.
Figure 3B:
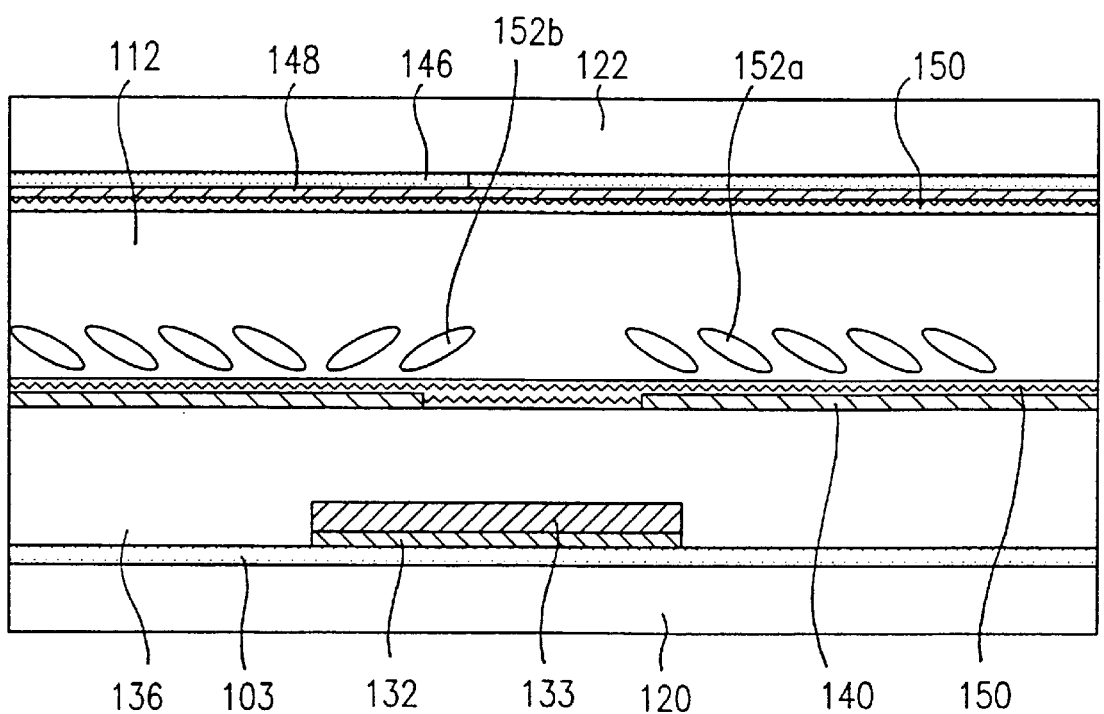
FIG. 3B is a sectional view taken along line 3B—3B of FIG. 3A.

FIG. 1 is a plan view of one pixel of a liquid crystal display device of one embodiment according to the present invention. FIG. 2A is a sectional view taken along line 2A—2A of FIG. 1, and FIG. 2B is a sectional view taken along line 2B—2B of FIG. 1. FIG. 3A is an enlarged plan view of a portion X in FIG. 1 where a gate signal line 104 and a source signal line 102 cross each other. FIG. 3B is a sectional view taken along line 3B—3B of FIG. 3A for describing overlaps of pixel electrodes 140 on the gate signal line 104 and the source signal line 102.

The fabrication of the liquid crystal display device according to the present invention will be described.

First, an active matrix substrate is fabricated in the following manner. The gate signal lines 104 together with gate electrodes and storage capacitor electrodes 126, a gate insulating film 103, semiconductor layers 134, channel protection layers 128, and $n^+$-Si layers 130 which are to be source electrodes and drain electrodes are formed in this order on a transparent insulating substrate 120 made of glass or the like by a known method. As shown in FIG. 1, one storage capacitor electrode 126 is formed for each row of pixels to run across the pixels substantially in parallel with the gate signal lines 104.

Thereafter, an ITO film 132 which is a transparent conductive film and a metal layer 133 are formed by sputtering and patterned to form the source signal lines 102. In this embodiment, each source signal line 102 is preferably a double-layer structure composed of the ITO film 132 and the metal layer 133. Such a double-layer structure is advantageous in that the possibility of disconnection of the source signal line is reduced since, even if the metal layer 133 is defective, for example, the source signal line is still connected via the ITO film 132.

After the formation of the layers constituting the source signal lines on the substrate 120, an interlayer insulating film 136 made of an acrylic resin or the like is formed to a thickness of preferably about 2 $\mu$m to about 4 $\mu$m. Contact holes 142 are then formed at predetermined positions through the interlayer insulating film 136.

A transparent conductive film made of ITO or the like is formed by sputtering, for example, on the interlayer insulating film 136, and patterned to form the pixel electrodes 140. Each pixel electrode 140 is connected via the contact hole 142 to the underlying ITO layer 132 which is in turn connected to the drain electrode of the. TFT, i.e., the $n^+$-Si layer 130.

The formation of the pixel electrodes 140 on the interlayer insulating film 136 will be described in detail.

Referring to FIGS. 3A and 3B, in this embodiment, when the direction of the pretilt angle of liquid crystal molecules 152a (an orientation direction $D_1$ of liquid crystal molecules 152a) has been determined, pixel electrodes 140a and 140b (and pixel electrodes 140d and 140c) are formed to overlap the gate signal line 104 and the source signal line 102 via the interlayer insulating film 136 so that the pixel electrodes 140a and 140b (and the pixel electrodes 140d and 140c) overlap the gate signal line 104 by different overlap widths dg1 and dg2, respectively. Especially, it is preferable that the overlap width dg1 of the pixel electrode 140a located downstream of the orientation direction $D_1$ with respect to the gate signal line 104 on the gate signal line 104 is larger than the overlap width dg2 of the pixel electrode 140b located upstream of the orientation direction $D_1$ on the gate signal line 104 (dg1>dg2). For example, the overlap widths dg1 and dg2 are about 3 μm and about 1 μm, respectively, and the distance between the pixel electrodes 140a and 140b is about 5 μm.

Figure 4:
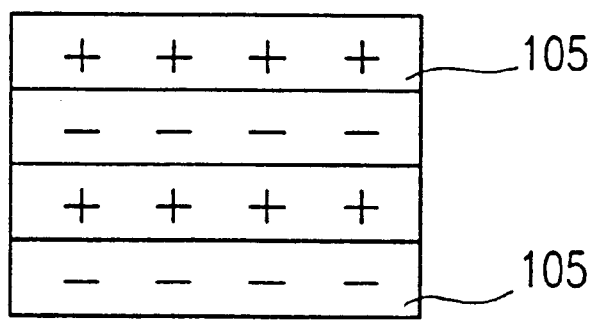
FIG. 4 illustrates a gate line inversion driving method employed for the liquid crystal display device according to the present invention.
Figure 5:
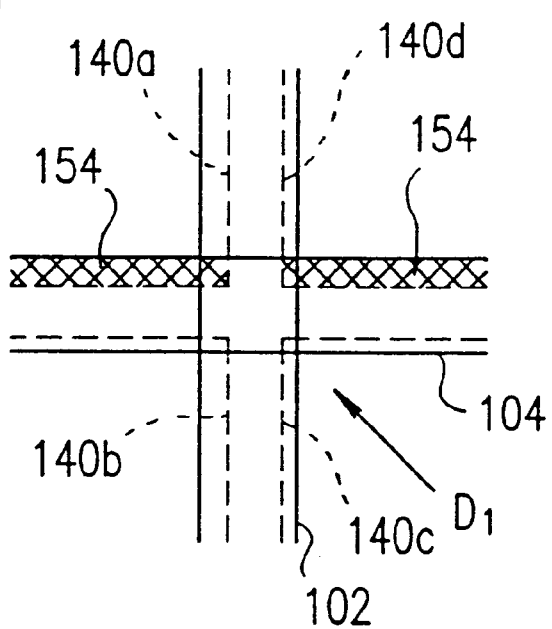
FIG. 5 is a plan view of a crossing of a gate signal line and a source signal line for describing regions where reverse tilt domains are generated with respect to the positions of signal lines and pixel electrodes when the liquid crystal display device is driven by the gate line inversion driving method.

Such a liquid crystal display device that satisfies the relationship between the overlap widths dg1 and dg2 can be driven by a gate line inversion method (an inversion driving method illustrated in FIG. 4 where a pixel signal is inverted every gate line 105, i.e., every horizontal (1H) period). FIG. 5 is a plan view showing a crossing of the gate signal line 104 and the source signal line 102 of a liquid crystal display device driven by the gate line inversion driving method. As shown in FIG. 5, generated reverse tilt domains 154 are well covered with the overlap portions of the pixel electrodes 140a and 140d on the gate signal line 104, and thus no light leakage occurs.

Alternatively, when the direction of the pretilt angle of liquid crystal molecules 152a (an orientation direction $D_1$ of liquid crystal molecules 152a) has been determined, the pixel electrodes 140a and 140d (and pixel electrodes 140b and 140c) may be formed to overlap the gate signal line 104 and the source signal line 102 via the interlayer insulating film 136 so that the pixel electrodes 140a and 140d (and pixel electrodes 140b and 140c) overlap the source signal line 102 by different overlap widths ds1 and ds2, respectively. Especially, it is preferable that the overlap width ds1 of the pixel electrode 140a located downstream of the orientation direction $D_1$ with respect to the source signal line 102 on the source signal line 102 is larger than the overlap width ds2 of the pixel electrode 140d located upstream of the orientation direction $D_1$ on the source signal line 102 (ds1>ds2). For example, the overlap widths ds1 and ds2 are about 3 μm and about 1 μm, respectively, and the distance between the pixel electrodes 140a and 140d is about 5 μm.

Figure 6:
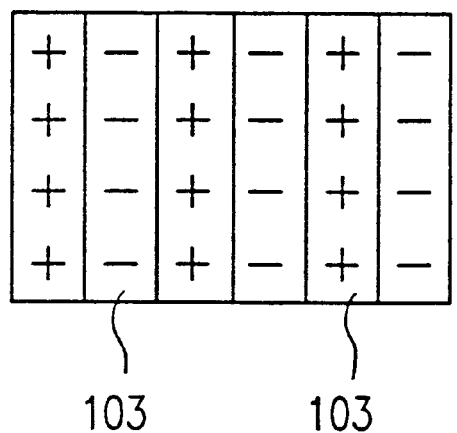
FIG. 6 illustrates a source line inversion driving method employed for the liquid crystal display device according to the present invention.
Figure 7:
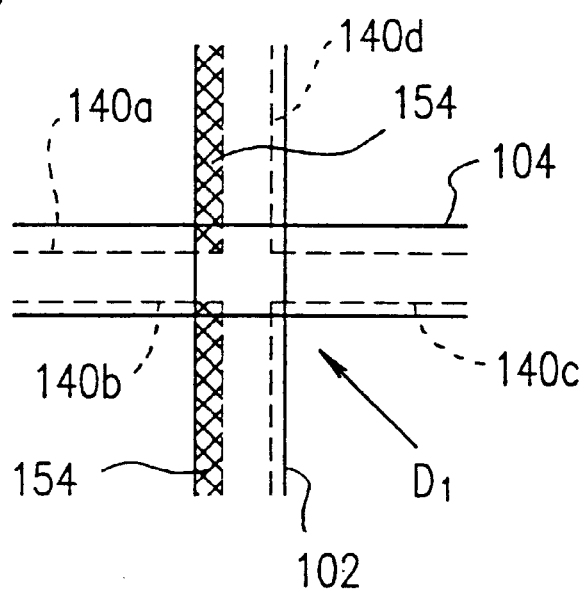
FIG. 7 is a plan view of a crossing of a gate signal line and a source signal line for describing regions where reverse tilt domains are generated with respect to the positions of signal lines and pixel electrodes when the liquid crystal display device is driven by the source line inversion driving method.

Such a liquid crystal display device that satisfies the relationship between the overlap widths ds1 and ds2 can be driven by a source line inversion driving method (an inversion driving method illustrated in FIG. 6 where signals with the opposite polarities are input into adjacent source lines 103, i.e., the polarities of the voltages written in horizontally adjacent pixels are different). FIG. 7 is a plan view showing a crossing of the gate signal line 104 and the source signal line 102 of a liquid crystal display device driven by the source line inversion driving method. As shown in FIG. 7, generated reverse tilt domains 154 are covered with the overlap portions of the pixel electrodes 140a and 140b on the source signal line 102, and thus no light leakage occurs.

Alternatively, when the direction of the pretilt angle of liquid crystal molecules 152a (an orientation direction $D_1$ of liquid crystal molecules 152a) has been determined, the pixel electrodes 140a, 140b, 140c, and 140d may be formed to overlap the gate signal line 104 and the source signal line 102 via the interlayer. insulating film 136 so that the pixel electrodes 140a and 140b (and the pixel electrodes 140d and 140c) overlap the gate signal line 104 by the different overlap widths dg1 and dg2, respectively, and the pixel electrodes 140a and 140d (and the pixel electrodes 140b and 140c) overlap the source signal line 102 by the different overlap widths ds1 and ds2, respectively. Especially, it is preferable that the overlap width dg1 of the pixel electrode 140a located downstream of the orientation direction $D_1$ with respect to the gate signal line 104 on the gate signal line 104 is larger than the overlap width dg2 of the pixel electrode 140b located upstream of the orientation direction $D_1$ on the gate signal line 104 (dg1>dg2), and the overlap width ds1 of the pixel electrode 140a located downstream of the orientation direction $D_1$ with respect to the source signal line 102 on the source signal line 102 is larger than the overlap width ds2 of the pixel electrode 140d located upstream of the orientation direction $D_1$ and the source signal line 102 (ds1>ds2). For example, the overlap widths dg1 and ds1 are about 3 μm, while the overlap widths dg2 and ds2 are about 1 μm. The distance between the adjacent electrodes is about 5 μm.

Figures 8, 9:
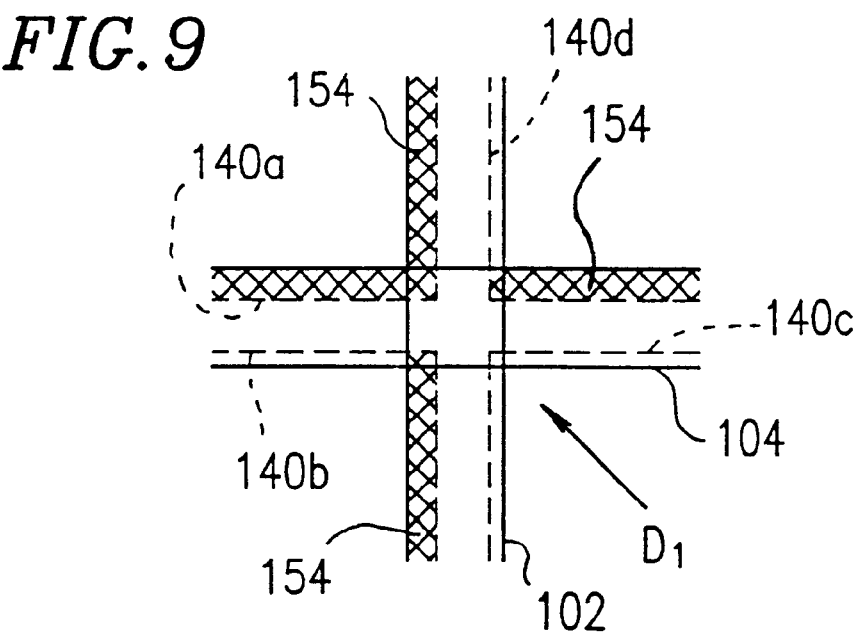
FIG. 8 illustrates a dot inversion driving method employed for the liquid crystal display device according to the present invention.
FIG. 9 is a plan view of a crossing of a gate signal line and a source signal line for describing regions where reverse tilt domains are generated with respect to the positions of signal lines and pixel electrodes when the liquid crystal display device is driven by the dot inversion driving method.

Such a liquid crystal display device that satisfies the relationship between the overlap widths dg1 and dg2 and that between the overlap widths ds1 and ds2 can be driven by a dot inversion driving method (an inversion driving method illustrated in FIG. 8 where the gate line inversion driving method and the source line inversion driving method are combined). FIG. 9 is a plan view showing a crossing of the gate signal line 104 and the source signal line 102 of a liquid crystal display device driven by the dot inversion driving method. As shown in FIG. 9, generated reverse tilt domains 154 are covered with the overlap portions of the pixel electrodes 140a and 140d on the gate signal line 104 and the overlap portions of the pixel electrodes 140a and 140b on the source signal line 102 , and thus no light leakage occurs.

In general, it is known that the reverse tilt domains 154 are generated due to an electric field generated between adjacent pixel electrodes in the overlap portion of the pixel electrode 140a on the gate signal line 104 and the overlap portion of the pixel electrode 140a on the source signal line 102, for example, with a width of about 1 μm to about 2 μm. The values of the overlap widths dg1 and ds1 are not specifically restricted but vary depending on the size of the generated reverse tilt domains, the processing precision of the gate signal lines and the source signal lines, the overlap precision of the pixel electrodes on the gate and source signal lines, and the processing precision of the pixel electrodes. A value obtained by adding an allowance of about 0.75 μm to about 1 μm for security to the width of the reverse tilt domain may be set. The overlap width dg1 is preferably in the range of about 2 μm to about 4 μm, typically about 3 μm. The overlap width ds1 is preferably in the range of about 2 μm to about 4 μm, typically about 3 μm.

The magnitude of the electric field generated between adjacent pixel electrodes changes as the width of the pixel electrodes is changed, changing the width of a generated reverse tilt domain. Therefore, the width of the pixel electrodes should be selected to be large enough to cover the width of a generated reverse tilt domain. The width of the pixel electrodes should also be selected depending on the potential to be applied to the pixel electrodes. For example, when potentials 5V and −5V are applied to the pixel electrodes at inversion driving, a reverse tilt domain with a width of 1 μm to 1.5 μm is generated. When potentials with a larger absolute value are applied, a reverse tilt domain with a larger width is generated. In reverse, when potentials with a smaller absolute value are applied, a reverse tilt domain with a smaller width is generated. The distance between adjacent pixel electrodes is not specifically restricted, but preferably in the range of about 4 μm to about 6 μm.

Following formation of the pixel electrodes, an alignment film 150 is formed on the interlayer insulating film 136 and rubbed. Thus, the active matrix substrate is obtained.

Next, a counter substrate is fabricated in the following manner. The counter substrate may be fabricated prior to the fabrication of the active matrix substrate described above.

Referring to FIGS. 2A and 2B again, a metal film made of Ta, Cr, Al or the like is formed by sputtering on a transparent insulating substrate 122 made of glass or the like, and patterned to form a light-shading layer 144. Then, a photosensitive color resist is applied to the portions of the substrate 122 where the light-shading layer 144 is not formed, and exposed to light and developed to form color layers 146 exhibiting red, blue, or green. As a result, each color layer 146 is surrounded by the light-shading layer 144. A counter electrode 148 made of ITO or the like is then formed on the light-shading layer 144 and the color layers 146 by sputtering, for example, so as to form a predetermined shape. An alignment film 150 is then formed on the counter electrode 148 and rubbed. Thus, the counter substrate is obtained.

As shown in FIG. 2B, the active matrix substrate and the counter substrate are laminated together by a known method so that the alignment films 150 face each other. The gap between the active matrix substrate and the counter substrate (cell gap) is about 4.5 μm, for example, which is however not specifically restricted but can be any selected value. After the lamination of the substrates, a liquid crystal material is injected into the gap by a known method to form a liquid crystal layer 112. Thus, the liquid crystal display device according to the present invention is obtained.

In this embodiment, the reverse tilt domain 154 as shown in FIG. 3B generated due to an electric field generated between adjacent pixel electrodes is shaded from light because it is formed within the overlap portion of the pixel electrode 140 on the gate signal line 104 and/or the overlap portion of the pixel electrode 140 on the source signal line 102. Light leakage from the reverse tilt domain is therefore prevented, and thus the resultant liquid crystal display device according to the present invention exhibits excellent display characteristics. Also, in the liquid crystal display device of this embodiment, since light leakage from the reverse tilt domain can be minimized without enlarging the light-shading region, a high aperture ratio can be maintained.

Assume that, in a 12.1' VGA display, the width of the gate signal line, the distance between the pixel electrodes sandwiching the gate signal line, the width of the source signal line, and the distance between the pixel electrodes sandwiching the source signal line are changed to 18 μm, 14 μm, 8 μm, and 4 μm, respectively, while the cell gap between the pixel electrode of the active matrix substrate and the counter electrode of the counter substrate is kept unchanged, i.e., 4.5 μm. In such a case, a reverse tilt domain is generated though the cell gap is smaller than the distance between the pixel electrodes sandwiching the gate signal line. In this case, also, the generated reverse tilt domain can be shaded from light according to the present invention.

In this embodiment, the liquid crystal display device where liquid crystal molecules are uniformly oriented in a fixed direction was described. The present invention is not restricted to this type, but can be applied to a liquid crystal display device where one pixel is divided into a plurality of portions having different orientations of liquid crystal molecules for maintaining good visibility despite variations in the viewing angle and for broadening the angle of visibility. According to the present invention, the arrangement of the overlap portions of each pixel electrode on the signal lines is determined depending on the orientation direction of the liquid crystal molecules. Accordingly, when each pixel is divided into a plurality of portions, the arrangement of the overlap portions of the pixel electrode on the signal lines should be changed depending on the orientation direction of the liquid crystal molecules in the vicinity of the pixel electrode.

EXAMPLE 2

Figure 10:
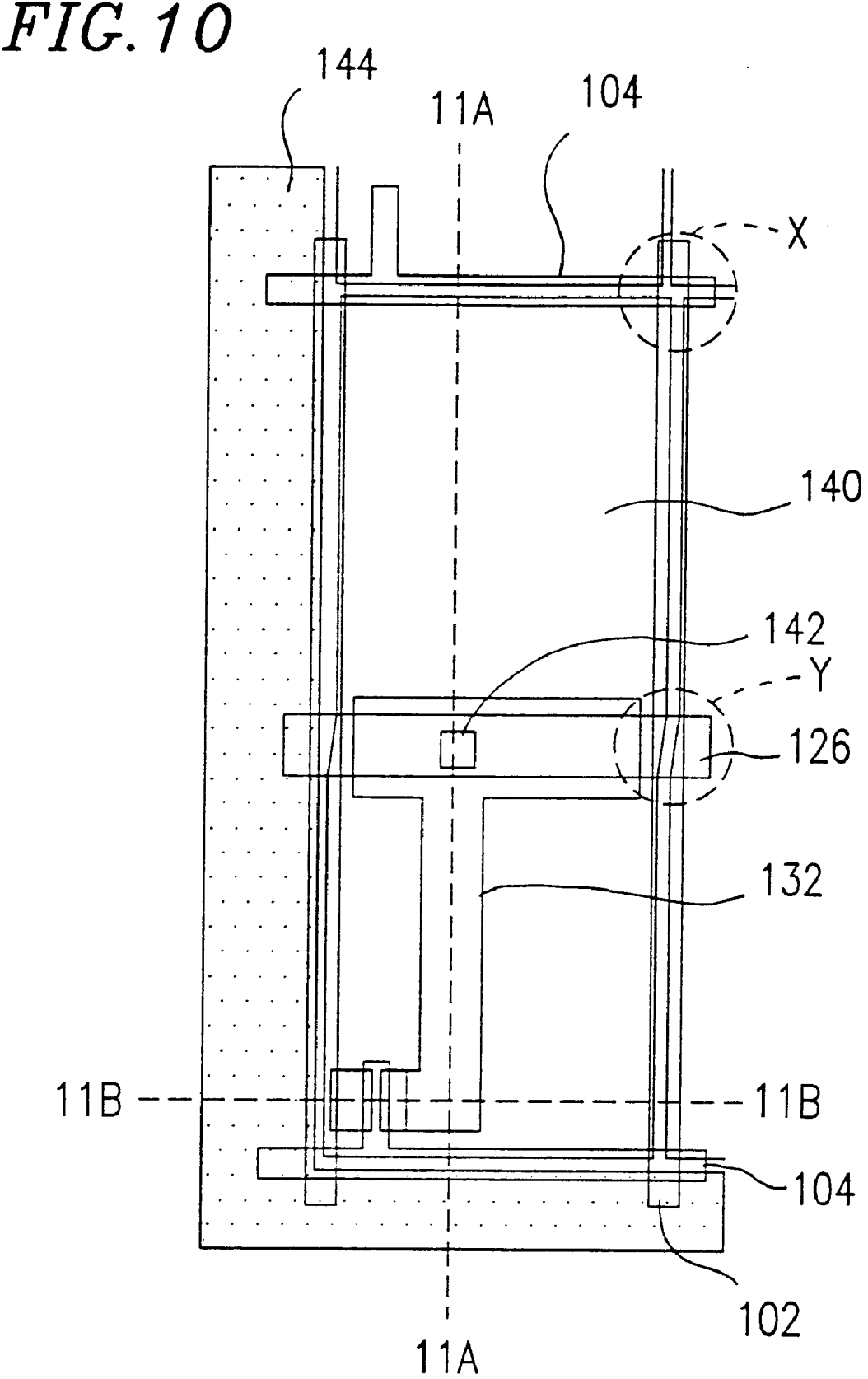
FIG. 10 is a plan view of one pixel of a liquid crystal display device of another embodiment according to the present invention.
Figure 11A:
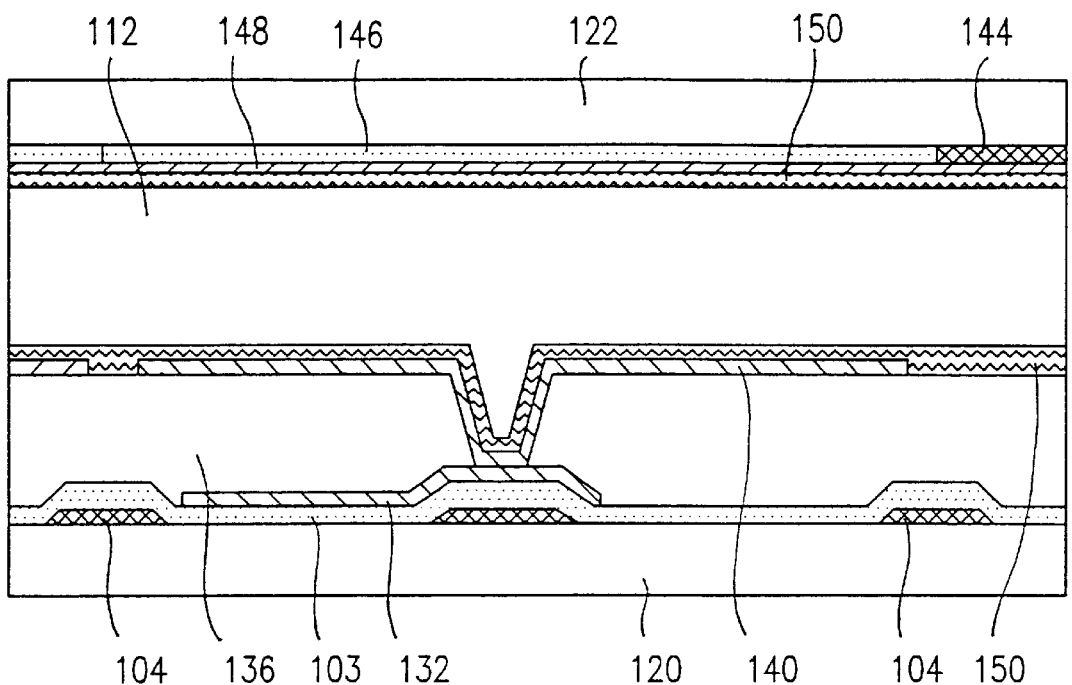
FIG. 11A is a sectional view of the liquid crystal display device, taken along line 11A—11A of FIG. 10.
Figure 11B:
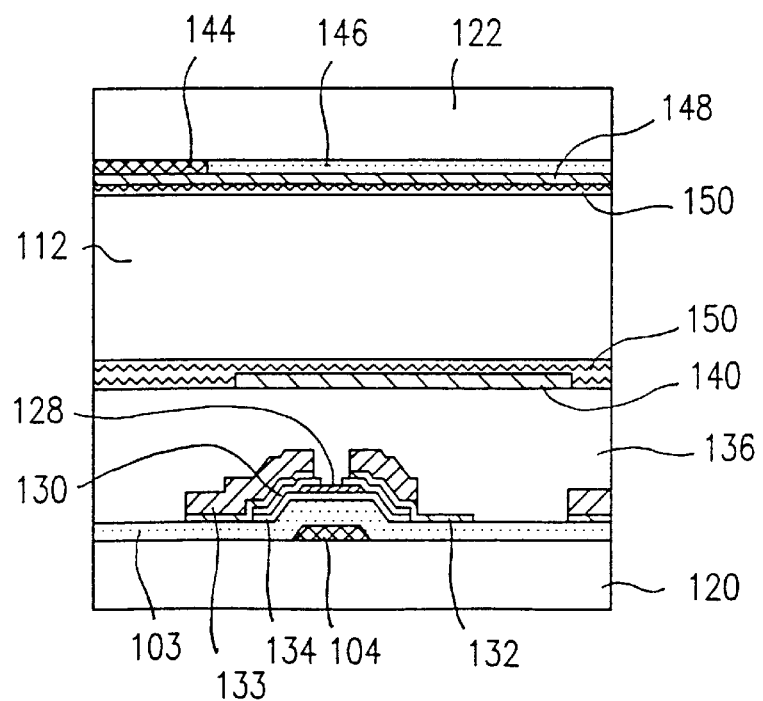
FIG. 11B is a sectional view of the liquid crystal display device, taken along line 11B—11B of FIG. 10.
Figure 12A:
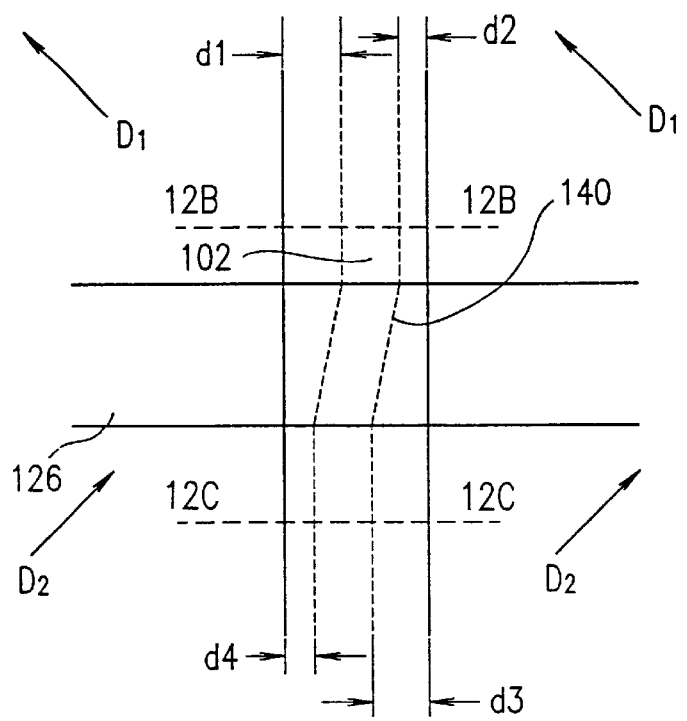
FIG. 12A is an enlarged plan view of a region Y in FIG. 10 where a source signal line and a storage capacitor electrode cross each other.
Figure 12B:
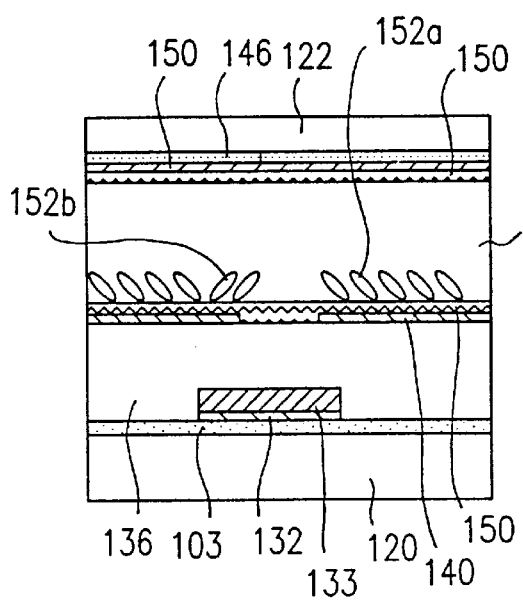
FIG. 12B is a sectional view taken along line 12B—12B of FIG. 12A.
Figure 12C:
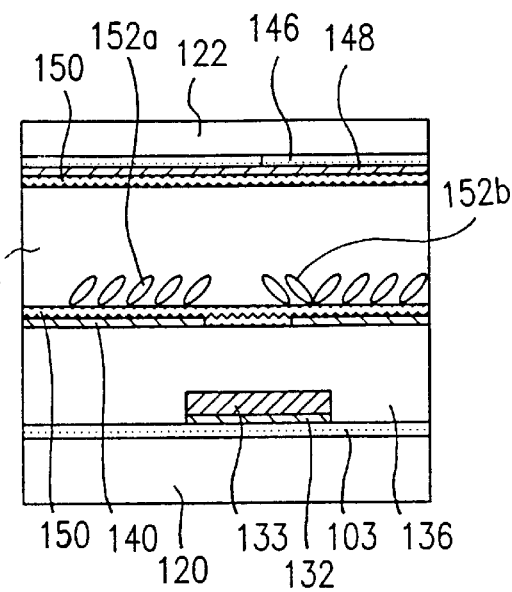
FIG. 12C is a sectional view taken along line 12C—12C of FIG. 12A.

FIG. 10 is a plan view of one pixel of a liquid crystal display device of another embodiment according to the present invention. FIG. 11A is a sectional view taken along line 11A—11A of FIG. 10, and FIG. 11B is a sectional view taken along line 11B—11B of FIG. 10. FIG. 12A is an enlarged plan view of a region Y in FIG. 10 where a storage capacitor electrode 126 and a source signal line 102 cross each other. FIG. 12B is a sectional view taken along line 12B—12B of FIG. 12A where a pixel electrode 140 overlaps the source signal line 102, and FIG. 12C is a sectional view taken along line 12C—12C of FIG. 12A where the pixel electrode 140 overlaps the source signal line 102.

As shown in FIG. 12A, each pixel of the liquid crystal display device of this embodiment is divided into two regions along a line corresponding to the storage capacitor electrode 126. The boundary of the two regions is shaded from light by the storage capacitor electrode 126. The two regions have different orientation directions $D_1$ and $D_2$ of liquid crystal molecules 152a (see FIG. 12B, for example), and the overlap widths of the corresponding two regions of the pixel electrode on the source signal line 102 are different from each other depending on the orientation directions $D_1$ and $D_2$.

The storage capacitor electrode 126 runs across each pixel substantially in parallel with a gate signal line 104 as shown in FIG. 10. One storage capacitor electrode 126 is provided for every row of pixels.

Referring to FIGS. 12A and 12B, when the different orientation directions $D_1$ and $D_2$ of the liquid crystal molecules 152a are provided as described above, the overlap widths of the pixel electrodes 140 on the corresponding source signal lines 102 via an interlayer insulating film 136 are adjusted in the following manner. That is, it is designed that overlap widths d1 and d3 of the regions of the pixel electrodes 140 located downstream of the orientation directions (the directions of the pretilt angles) of the liquid crystal molecules 152a on the source signal line 102 is larger than overlap widths d2 and d4 of the regions of the pixel electrodes 140 located upstream of the orientation directions of the liquid crystal molecules 152a on the source signal line 102. The overlap widths d1 and d3 are preferably equal to each other. Likewise, the overlap widths d2 and d4 are preferably equal to each other. The overlap widths d1 and d3 are not specifically restricted, but preferably in the range of about 2.5 μm to about 3.5 μm, typically about 3 μm. The overlap widths d2 andd4 are not specifically restricted, but preferably in the range of about 0.5 μm to about 1.5 μm, typically about 1 μm.

The electric field generated between adjacent pixel electrodes changes as the width of the pixel electrodes is changed, changing the width of a generated reverse tilt domain. Therefore, the width of the pixel electrodes should be selected to be large enough to cover the width of a generated reverse tilt domain. The distance between adjacent pixel electrodes is not specifically restricted, but preferably in the range of about 4 μm to about 6 μm, typically about 5 μm.

In this embodiment, as shown in FIG. 12A, the source signal line 102 is substantially linear. The edge of one region of the pixel electrode 140 where the liquid crystal molecules are oriented in the orientation direction $D_1$ overlapping the source signal line 102 is offset from the edge of the other region of the pixel electrode 140 where the liquid crystal molecules are oriented in the orientation direction $D_2$ overlapping the source signal line 102.

When the liquid crystal display device with the above configuration is driven by the dot inversion driving method, as illustrated in FIGS. 12B and 12C, a reverse tilt domain where liquid crystal molecules are reversely tilted as indicated by the reference numeral 152b is generated due to an electric field generated between adjacent pixel electrodes. However, since such a reverse tilt domain is generated within the overlap region of the pixel electrode 140 on the source signal line 102, it can be shaded from light by the overlap region. Thus, in the liquid crystal display device of this embodiment, light leakage from the reverse tilt domain can be prevented, and excellent display characteristics are exhibited. Also, in the liquid crystal display device of this embodiment, since light leakage from the reverse tilt domain can be minimized without enlarging the light-shading region, a high aperture ratio can be maintained. This is also applicable to a reverse tilt-domain generated due to an electric field generated between adjacent pixel electrodes sandwiching the source signal line 102 at the crossing of the gate signal line 104 and the source signal line 102 indicated by a region X in FIG. 10.

The above effects can also be obtained when the liquid crystal display device of this embodiment is driven by the source line inversion driving method.

EXAMPLE 3

Figure 13:
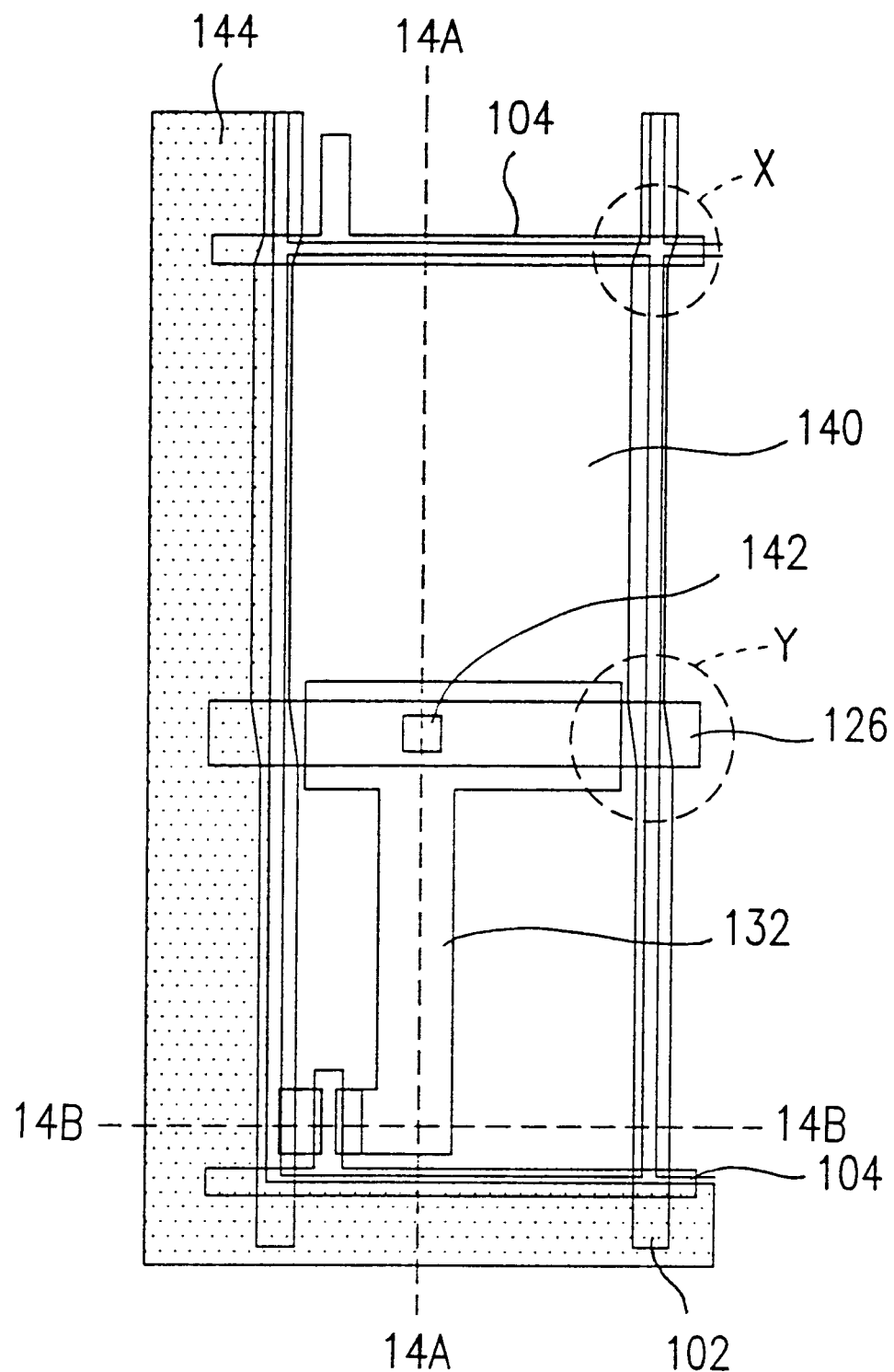
FIG. 13 is a plan view of one pixel of a liquid crystal display device of still another embodiment according to the present invention.
Figure 14A:
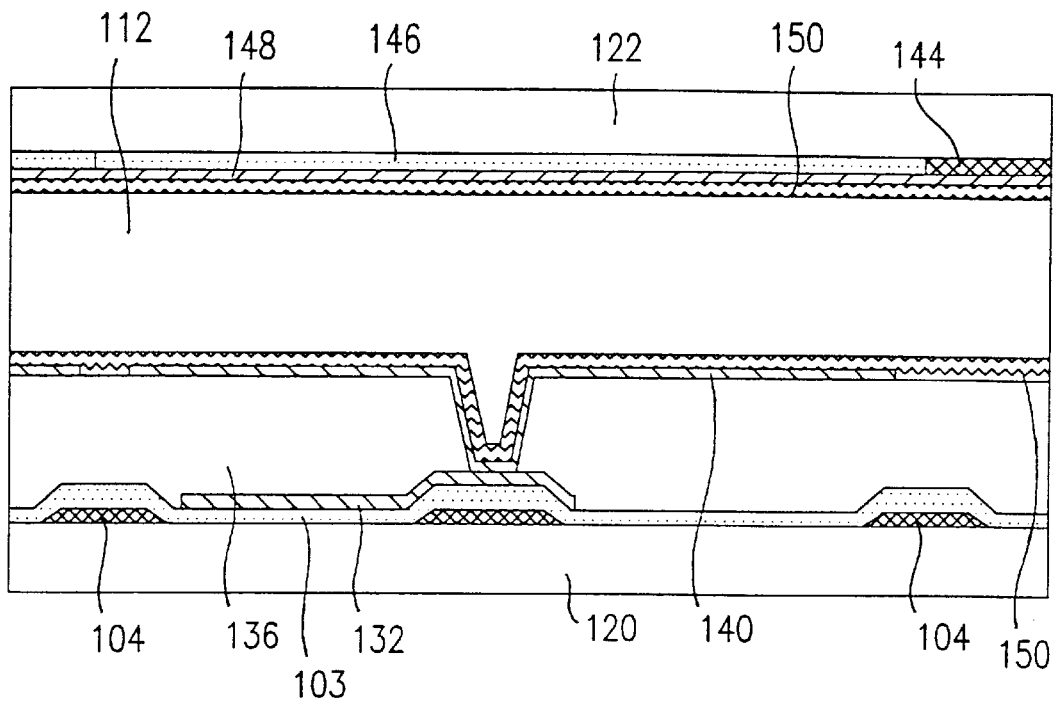
FIG. 14A is a sectional view of the liquid crystal display device, taken along line 14A—14A of FIG. 13.
Figure 14B:
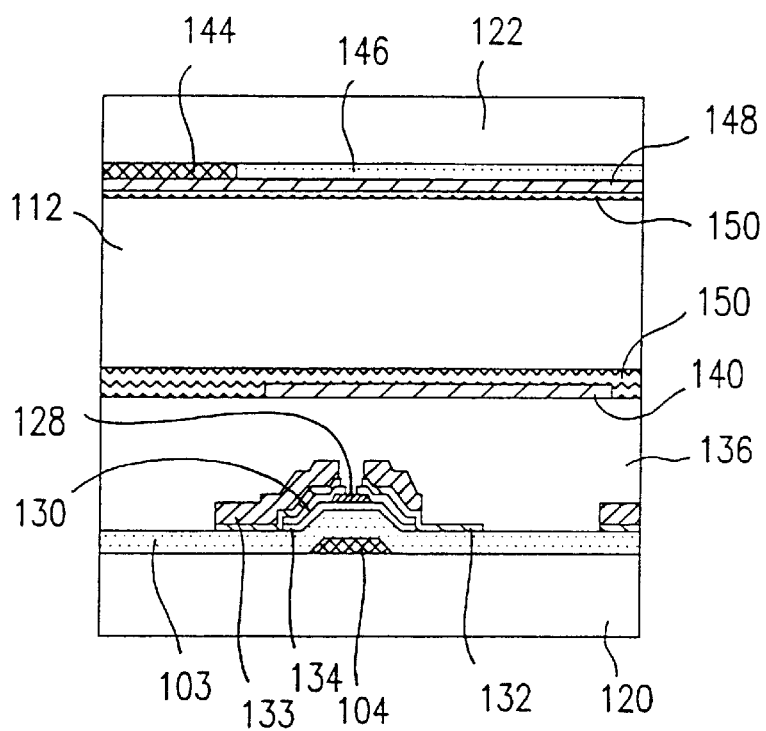
FIG. 14B is a sectional view of the liquid crystal display device, taken along line 14B—14B of FIG. 13.
Figure 15A:
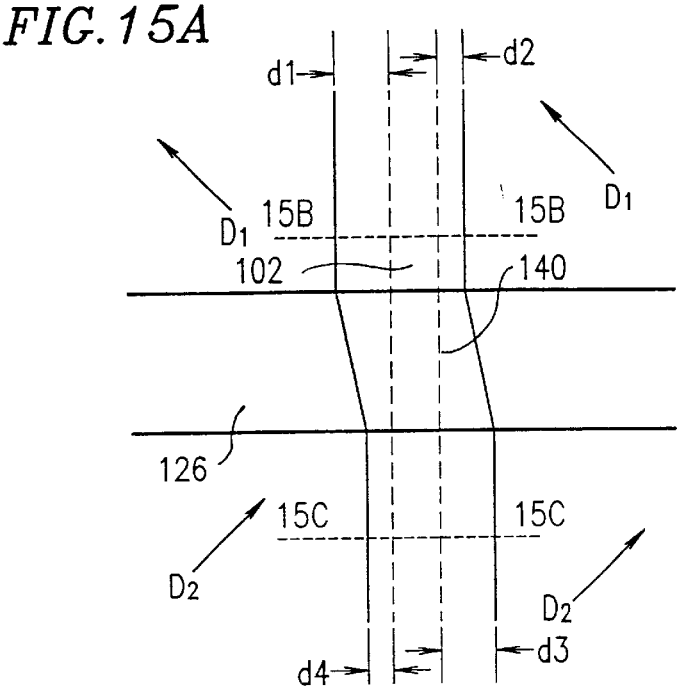
FIG. 15A is an enlarged plan view of a region Y in FIG. 13 where a source signal line and a storage capacitor electrode cross each other.
Figure 15B:
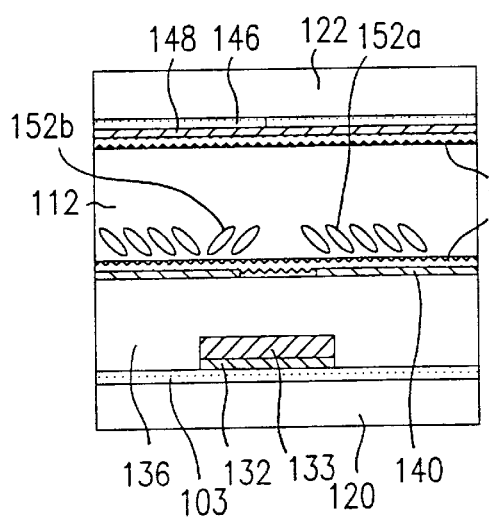
FIG. 15B is a sectional view taken along line 15B—15B of FIG. 15A.
Figure 15C:
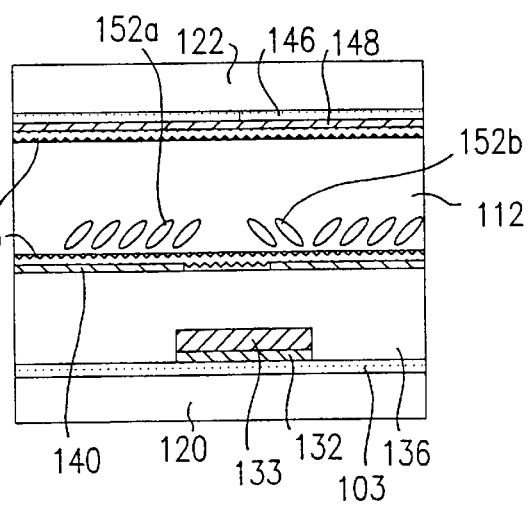
FIG. 15C is a sectional view taken along line 15C—15C of FIG. 15A.

FIG. 13 is a plan view of one pixel of a liquid crystal display device of still another embodiment according to the present invention. FIG. 14A is a sectional view taken along line 14A—14A of FIG. 13, and FIG. 14B is a sectional view taken along line 14B—14B of FIG. 13. FIG. 15A is an enlarged plan view of a region Y in FIG. 13 where a storage capacitor electrode 126 and a source signal line 102 cross each other. FIG. 15B is a sectional view taken along line 15B—15B of FIG. 15A where a pixel electrode 140 overlaps the source signal line 102, and FIG. 15C is a sectional view taken along line 15C—15C of FIG. 15A where the pixel electrode 140 overlaps the source signal line 102.

As shown in FIG. 15A, each pixel of the liquid crystal display device of this embodiment is divided into two regions along a line corresponding to the storage capacitor electrode 126. The boundary of the two regions is shaded from light by the storage capacitor electrode 126. The two regions have different orientation directions $D_1$ and $D_2$ of liquid crystal molecules 152a (see FIG. 15B, for example), and the overlap widths of the corresponding two regions of the pixel electrode on the source signal line 102 are different from each other depending on the orientation directions $D_1$ and $D_2$.

The storage capacitor electrode 126 runs across each pixel substantially in parallel with a gate signal line 104 as shown in FIG. 13. One storage capacitor electrode 126 is provided for every row of pixels.

Referring to FIGS. 15A and 15B, when the different orientation directions $D_1$ and $D_2$ of the liquid crystal molecules 152a are provided as described above, the overlap widths of the pixel electrodes 140 on the corresponding source signal lines 102 via an interlayer insulating film 136 are adjusted in the following manner. That is, it is designed that overlap widths d1 and d3 of the regions of the pixel electrodes 140 located downstream of the orientation directions of the liquid crystal molecules 152a on the source signal line 102 is larger than overlap widths d2 and d4 of the regions of the pixel electrodes 140 located upstream of the orientation directions on the source signal line 102. The overlap widths d1 and d3 are preferably equal to each other. Likewise, the overlap widths d2 and d4 are preferably equal to each other. The overlap widths d1 and d3 are not specifically restricted, but preferably in the range of about 2.5 μm to about 3.5 μm, typically about 3 μm. The overlap widths d2 and d4 are not specifically restricted, but preferably in the range of about 0.5 μm to about 1.5 μm, typically about 1 μm.

The electric field generated between adjacent pixel electrodes changes as the width of the pixel electrodes is changed, changing the width of a generated reverse tilt domain. Therefore, the width of the pixel electrodes should be selected to be large enough to cover the width of a generated reverse tilt domain. The distance between adjacent pixel electrodes is not specifically restricted, but preferably in the range of about 4 μm to about 6 μm, typically about 5 μm.

The liquid crystal display device of this embodiment is preferably designed as follows. As shown in FIG. 15A, the edge of one region of the pixel electrode 140 where the liquid crystal molecules are oriented in the orientation direction $D_1$ overlapping the source signal line 102 is aligned with the edge of the other region of the pixel electrode 140 where the liquid crystal molecules are oriented in the orientation direction $D_2$ overlapping the source signal line 102. In contrast, the end of the region of the source signal line 102 corresponding to the region having the orientation direction $D_1$ is offset from the end of the region of the source signal line 102 corresponding to the region having the orientation direction $D_2$ (i.e., the source signal line 102 meanders).

When the liquid crystal display device with the above configuration is driven by the dot inversion driving method, as illustrated in FIGS. 15B and 15C, a reverse tilt domain where liquid crystal molecules are reversely tilted as indicated by the reference numeral 152b is generated due to an electric field generated between adjacent pixel electrodes sandwiching the source signal line 102. However, since such a reverse tilt domain is generated within the overlap portion of the pixel electrode 140 on the source signal line 102, it can be shaded from light by the overlap portion. Thus, in the liquid crystal display device of this embodiment, light leakage from the reverse tilt domain can be prevented, and excellent display characteristics are exhibited. Also, in the liquid crystal display device of this embodiment, since light leakage from the reverse tilt domain can be minimized without enlarging the light-shading region, a high aperture ratio can be maintained. This is also applicable to a reverse tilt domain generated due to an electric field generated between adjacent pixel electrodes sandwiching the source signal line 102 at the crossing of the gate signal line 104 and the source signal line 102 indicated by a region X in FIG. 13.

The above effects can also be obtained when the liquid crystal display device of this embodiment is driven by the source line inversion driving method.

In Examples 2 and 3 above, each pixel was vertically divided into the first and second regions which are lined along the source signal line and have different orientation directions of liquid crystal molecules. Alternatively, the pixel may be divided in a different direction. Examples 2 and 3 are also applicable to a liquid crystal display device where each pixel is divided into first and second regions which are lined along the gate signal line and have different orientation directions of liquid crystal molecules. In this case, the arrangement of the overlap portions of the first and second regions of the pixel electrode on the corresponding signal lines should be determined depending on the orientation directions of liquid crystal molecules in the first and second regions.

Moreover, in Examples 2 and 3, the boundary of the first and second regions having different orientation directions of liquid crystal molecules is shaded from light by the storage capacitor electrode 126. In the case where the boundary of the first and second regions runs differently, an additional light shade may be provided to shade the boundary. For example, in a liquid crystal display device where each pixel is divided into regions lined along the gate signal line, a light shade may be formed across each pixel electrode in the direction of the source signal line.

Furthermore, in Examples 2 and 3, the overlap widths of the pixel electrodes on the signal lines can be varied depending on the areas where reverse tilt domains are generated for any of the flame inversion driving method, the gate line inversion driving method, the source line inversion driving method, and the dot inversion driving method. This can be combined with both the overlap portion of the pixel electrode on the source signal line and the overlap portion of the pixel electrode on the gate signal line shown in Example 1.

The liquid crystal display devices of Examples 1 to 3 have a POP structure where each pixel electrode is insulated from the corresponding source and gate signal lines by the interlayer insulating film and the pixel electrode is connected to the drain electrode of the corresponding TFT via the contact hole formed through the interlayer insulating film. The present invention is also applicable to a liquid crystal display device which does not have the POP structure, for example, a liquid crystal display device where an insulating film thinner than the interlayer insulating film is formed to ensure the insulation between each pixel electrode and the corresponding gate and source signal lines and the pixel electrode is connected with the drain electrode of the corresponding TFT, not via a contact hole.

EXAMPLE 4

Figure 16A:
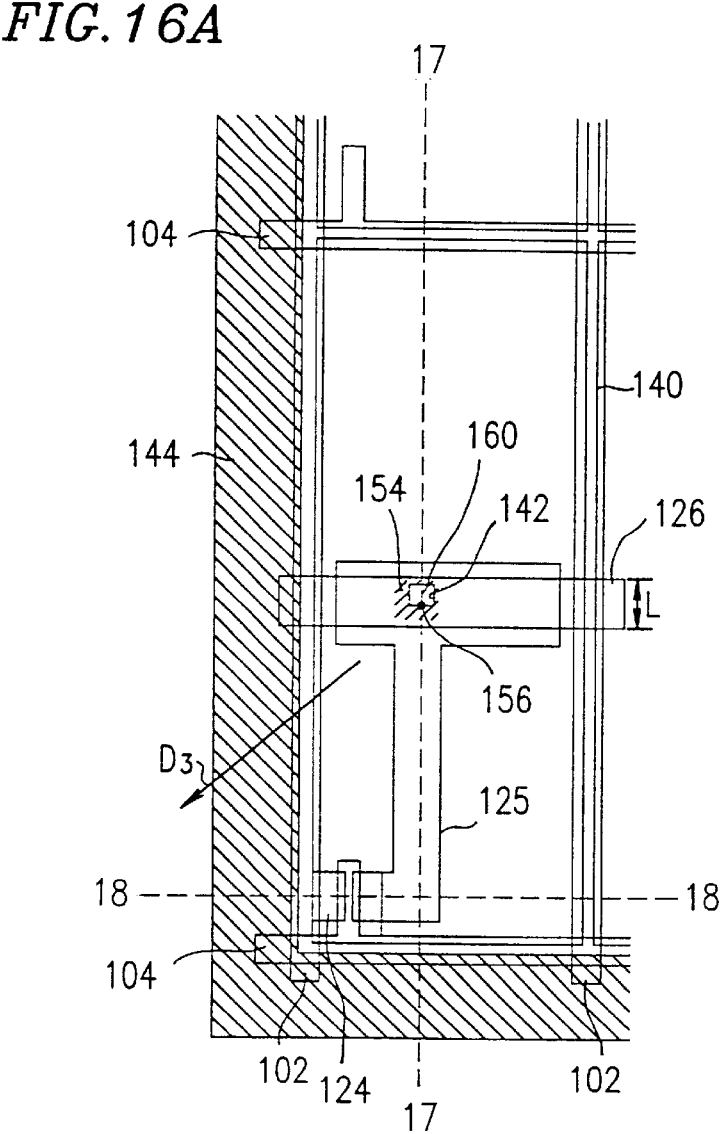
FIG. 16A is a plan view of one pixel of a liquid crystal display device of still another embodiment according to the present invention.
Figure 16B:
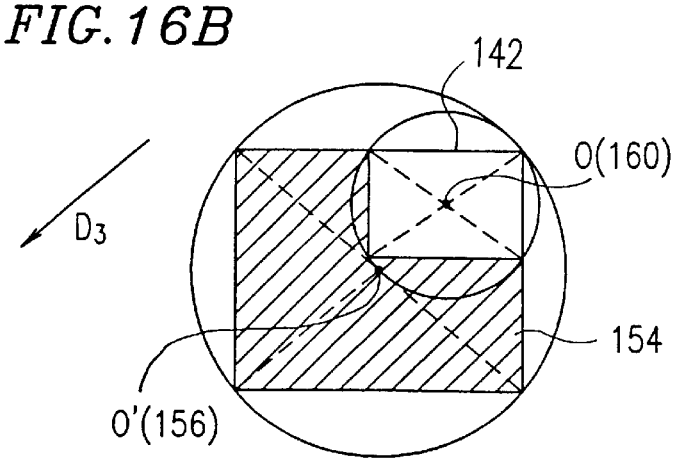
FIG. 16B is a plan view of an area around a contact hole for describing the terms "the center axis of the contact hole", "the center axis of the storage capacitor electrode", and "the center axis of the light-shading signal line" as used herein.
Figure 17:
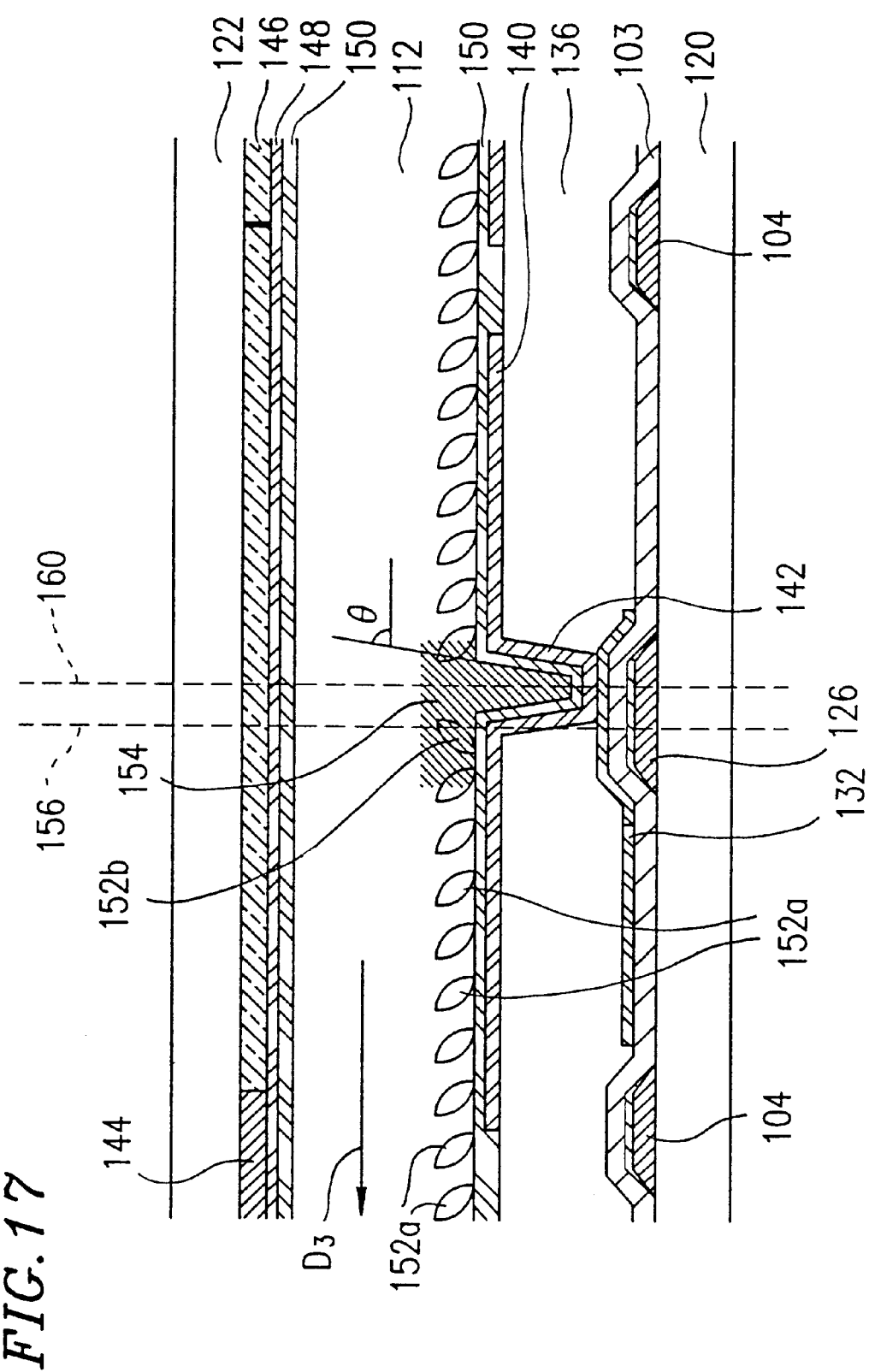
FIG. 17 is a sectional view of the liquid crystal display device, taken along line 17—17 of FIG. 16A.
Figure 18:
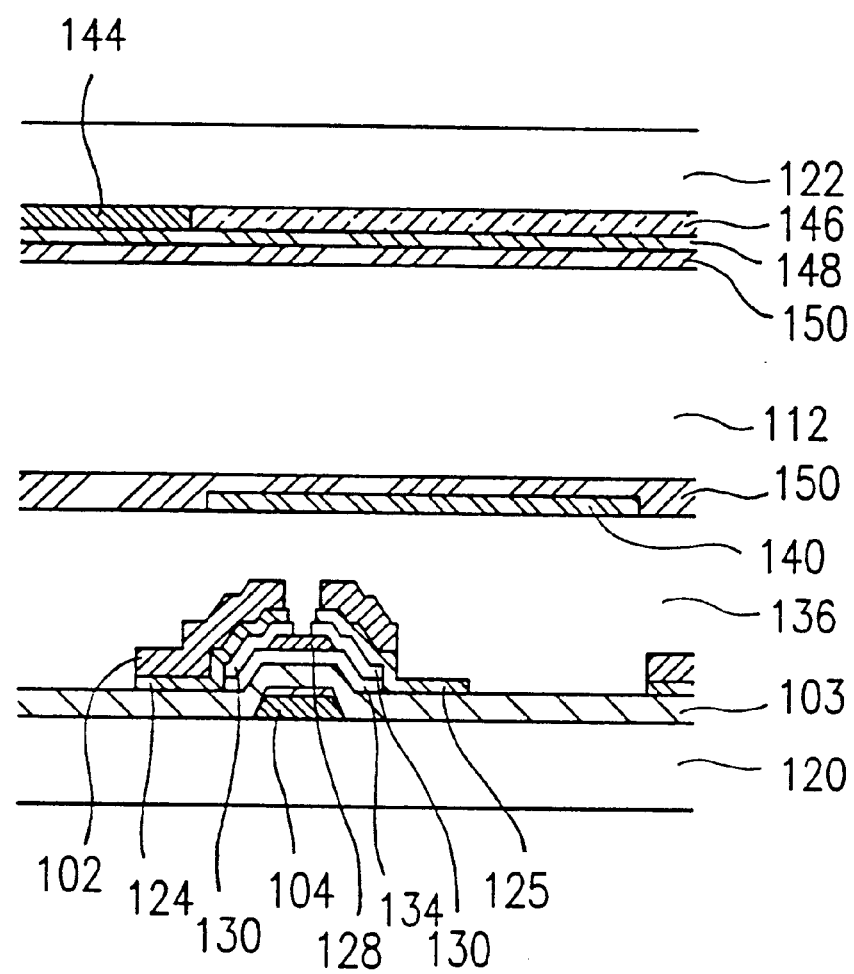
FIG. 18 is a sectional view of the liquid crystal display device, taken along line 18—18 of FIG. 16A.

FIG. 16A is a plan view of one pixel of a liquid crystal display device of still another embodiment according to the present invention. FIG. 16B is an enlarged plan view of an area around the contact hole of FIG. 16A. FIG. 17 is a sectional view taken along line 17—17 of FIG. 16A, and FIG. 18 is a sectional view taken along line 18—18 of FIG. 16A.

As shown in FIGS. 16A and 17, in the liquid crystal display device of this embodiment, a contact hole 142 is formed above a storage capacitor electrode 126 which is located under an extended drain electrode 125. However, a center axis 160 of the contact hole 142 is offset from a center axis 156 of the storage capacitor electrode 126. Referring to FIG. 16B, the term "center axis of the contact hole" as used herein refers to an axis extending in a direction vertical to the plane of FIG. 16B from a center O of a circumscribed circle of the contact hole 160 having an arbitrary shape, and the term "center axis of the storage capacitor electrode" as well as the term "center axis of a light-shading signal line" as used herein refer to an axis extending in a direction vertical to the plane of FIG. 16B from a center O' of a circumscribed circle of a generated reverse tilt domain 154.

In this embodiment, the center axis 160 of the contact hole 142 is preferably offset from the center axis 156 of the storage capacitor electrode 126 in an orientation direction $D_3$ (the direction of a pretilt) of liquid crystal molecules 152a. The distance between the center axes 160 and 156 is preferably in the range of about 0.5 $\mu$m to about 1.5 $\mu$m, typically about 1.5 $\mu$m. The reverse tilt domain 154 is generated at a position where the center thereof is offset from the center axis 160 of the contact hole 142 in the direction opposite to the orientation direction $D_3$ of the liquid crystal molecules 152a. Thus, the generated reverse tilt domain 154 is located above the storage capacitor electrode 126. Light leakage from the reverse tilt domain 154 is therefore effectively prevented by the storage capacitor electrode 126. In the liquid crystal display device of this embodiment, this makes it possible to minimize the line width of the storage capacitor electrode 126 and maintain a high aperture ratio.

The fabrication of the liquid crystal display device of this embodiment will be described with reference to FIGS. 17 and 18.

First, an active matrix substrate is fabricated in the following manner. Gate signal lines 104 together with gate electrodes and the storage capacitor electrodes 126, a gate insulating film 103, semiconductor layers 134, channel protection layers 128, and $n^+$-Si layers 130 which are to be source electrodes and drain electrodes are formed in this order on a transparent insulating substrate 120 made of glass or the like by a known method. In this embodiment, as shown in FIG. 16A, one storage capacitor electrode 126 is formed for each row of pixels to run across the pixels substantially in parallel with the gate signal line 104.

Thereafter, an ITO film 132 which is a transparent conductive film and a metal layer 133 are formed by sputtering and patterned to form source signal lines 102. In this embodiment, each source signal line 102 is preferably a double-layer structure composed of the ITO film 132 and the metal layer 133. Such a double-layer structure is advantageous in that the possibility of disconnection of the source signal line is reduced since, even if the metal layer 133 is defective, for example, the source signal line is still connected via the ITO film 132.

After the formation of the layers constituting the source signal lines on the substrate 120, an interlayer insulating film 136 made of an acrylic resin or the like is formed to a thickness of preferably about 2 $\mu$m to about 4 $\mu$m, typically about 3 $\mu$m. Then, pixel electrodes 140 are formed on the interlayer insulating film 136 by the above-described method or a known method. An alignment film 150 is then formed over the interlayer insulating film 136 and rubbed.

The contact holes 142 are formed at predetermined positions through the interlayer insulating film 136 by a predetermined method. An angle θ of an inclined inner wall of each contact hole 142 is preferably between about 45° or more and less than about 65°. A diameter φ of the contact hole 142 is preferably in the range of about 3.5 $\mu$m to about 6 $\mu$m, typically about 4 $\mu$m. With the above settings, the storage capacitor electrode 126 can effectively prevent light leakage from the reverse tilt domain 154 as described above. Thus, in the liquid crystal display device of this embodiment, the line width of the storage capacitor electrode 126 can be minimized and a high aperture ratio can be maintained.

In this embodiment, a line width L of each storage capacitor electrode 126 is represented by equation (I) below:

$$L = 2\left(\frac{d}{\tan\theta}\right) + \phi + n \quad (I)$$

where d denotes the thickness of the interlayer insulating film 136, θ denotes the angle of the inclined inner wall of the contact hole 142, φ denotes the diameter of the contact hole 142, and n denotes the minimum width of a light-shading film required to prevent minimum light leakage from the reverse tilt domain.

As is apparent from expression (I), in order to reduce the line width L of the storage capacitor electrode 126 and increase the aperture ratio of each pixel, it is required to reduce the thickness d of the interlayer insulating film 136, increase the angle θ of the inclined inner wall of the contact hole 142, and reduce the minimum width n of a light-shading film required to prevent minimum light leakage from the reverse tilt domain.

In reality, the thickness d, the diameter φ, and the minimum width n have respective limits. The angle θ is set at less than 65° since otherwise film formation at the contact hole 142 is not well performed and more than 45° since otherwise the diameter of the contact hole 142 becomes too large.

After the formation of the contact holes 142, an alignment film 150 is formed on the interlayer insulating film 136 and rubbed. Thus, the active matrix substrate is obtained.

Next, a counter substrate is fabricated in the following manner. The counter substrate may be fabricated prior to the fabrication of the active matrix substrate described above.

Referring to FIGS. 17 and 18 again, a metal film made of Ta, Cr, Al or the like is formed by sputtering on a transparent insulating substrate 122 made of glass or the like, and patterned to form a light-shading layer 144. Then, a photosensitive color resist is applied to the portions of the substrate 122 where the light-shading layer 144 is not formed, and exposed to light and developed to form color layers (color filters) 146 exhibiting red, green, or blue. As a result, each color filter 146 is surrounded by the light-shading layer 144. A counter electrode 148 made of ITO or the like is then formed on the light-shading layer 144 and the color filters 146 by sputtering, for example, so as to form a predetermined shape. An alignment film 150 is formed on the counter substrate and rubbed. Thus, the counter electrode is obtained.

The thus-fabricated active matrix substrate and counter substrate are laminated together by a known method so that the alignment films 150 face each other with a predetermined gap (cell gap) therebetween. After the lamination of the substrates, a liquid crystal material is injected into the gap by a known method to form a liquid crystal layer 112. Thus, the liquid crystal display device of this embodiment is obtained.

EXAMPLE 5

Figure 19:
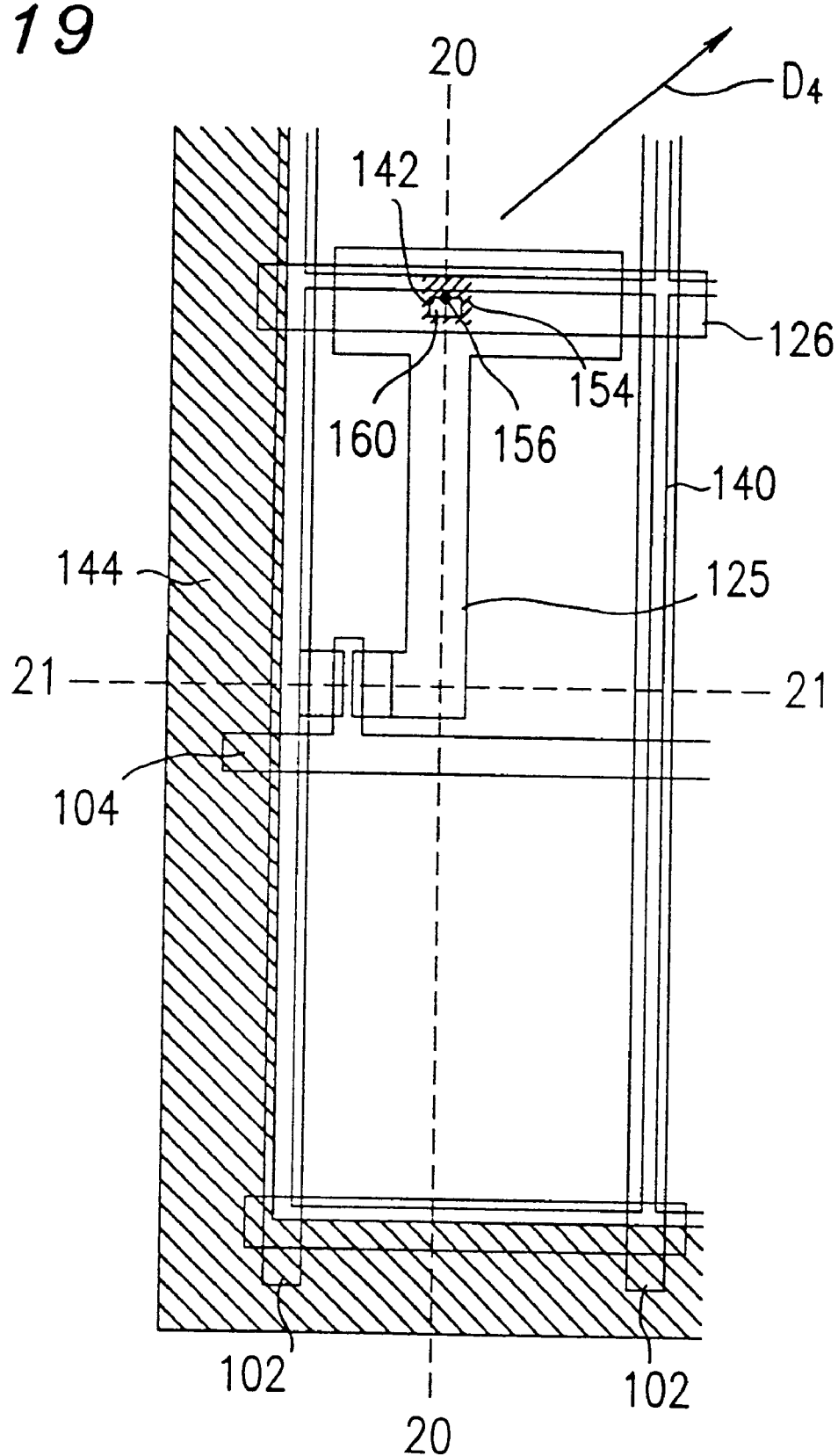
FIG. 19 is a plan view of one pixel of a liquid crystal display device of still another embodiment according to the present invention.
Figure 20:
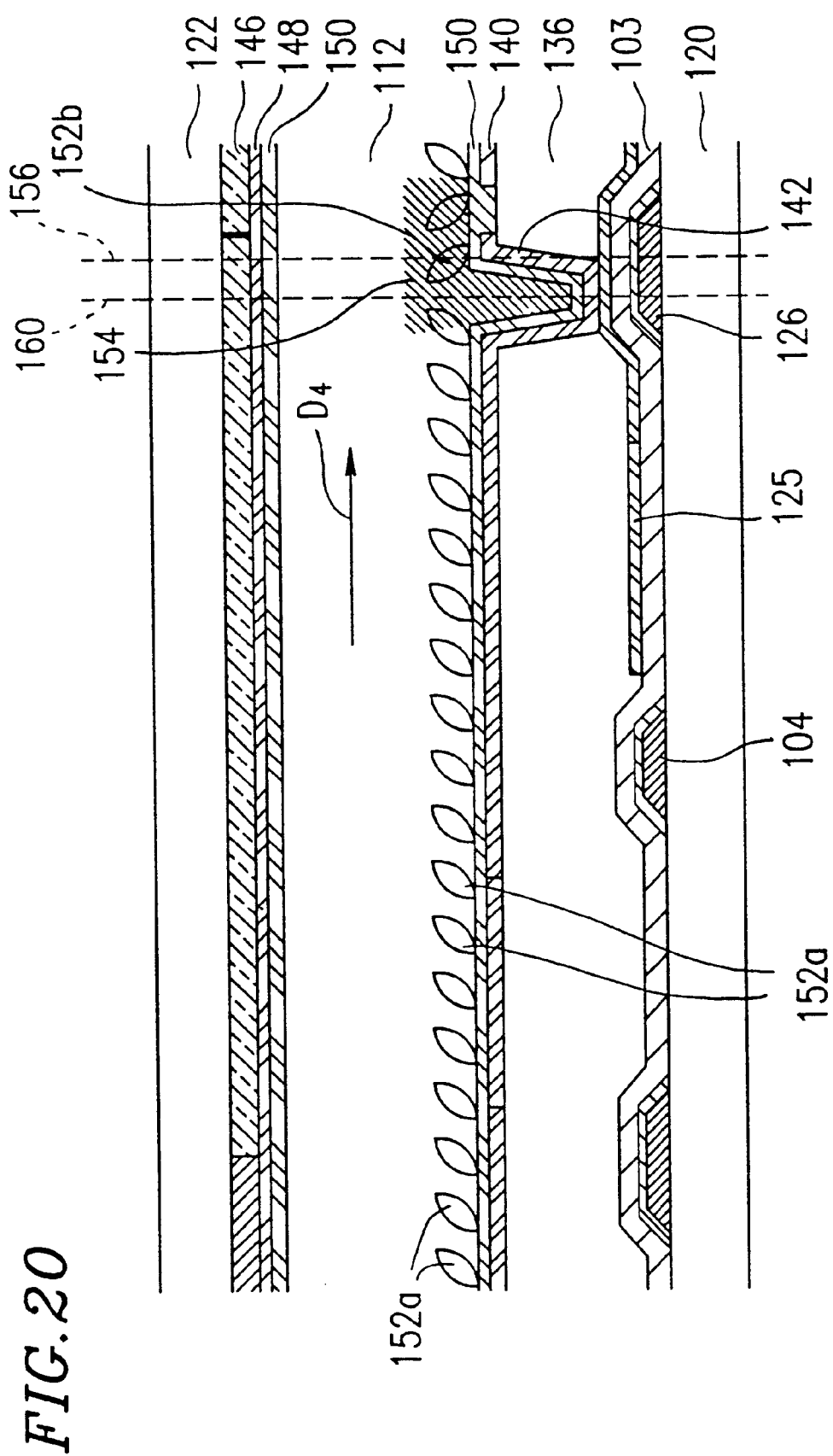
FIG. 20 is a sectional view of the liquid crystal display device, taken along line 20—20 of FIG. 19.
Figure 21:
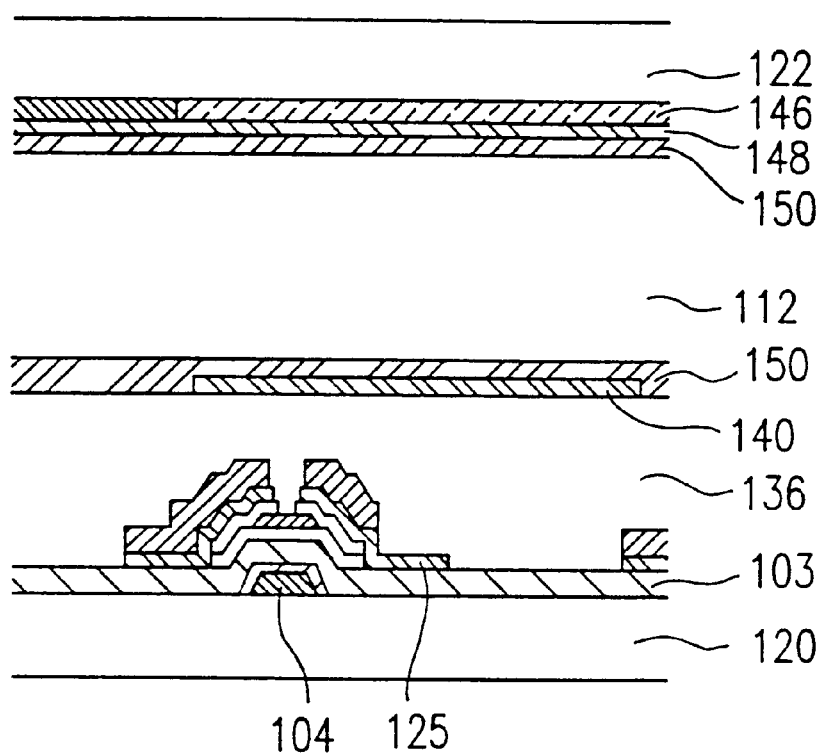
FIG. 21 is a sectional view of the liquid crystal display device, taken along line 21—21 of FIG. 19.

FIG. 19 is a plan view of one pixel of a liquid crystal display device of still another embodiment according to the present invention. FIG. 20 is a sectional view taken along line 20—20 of FIG. 19, and FIG. 21 is a sectional view taken along line 21—21 of FIG. 19.

In this embodiment, an orientation direction $D_4$ of liquid crystal molecules 152a in a liquid crystal layer 112 is opposite to the orientation direction $D_3$ in the liquid crystal display device of Example 4 shown in FIG. 17. As shown in FIG. 19, each storage capacitor electrode 126 runs between adjacent pixel electrodes 140, and each gate signal line 104 runs across the center of each pixel electrode 140. Each extended drain electrode 125 extends to an adjacent pixel electrode and overlaps the storage capacitor electrode 126.

As shown in FIG. 20, in the liquid crystal display device of this embodiment, each contact hole 142 is formed above the storage capacitor electrode 126 which is located under the extended drain electrode 125. However, a center axis 160 of the contact hole 142 is offset from a center axis 156 of the storage capacitor electrode 126.

In this embodiment, the center axis 160 of the contact hole 142 is preferably offset from the center axis 156 of the storage capacitor electrode 126 in the orientation direction $D_4$ of the liquid crystal molecules 152a by a predetermined distance. The distance between the center axes 160 and 156 can be the same as that described in Example 4. The reverse tilt domain 154 is generated at a position where the center thereof is offset from the center axis 160 of the contact hole 142 in the direction opposite to the-orientation direction $D_4$ of the liquid crystal molecules 152a. Thus, the generated reverse tilt domain 154 is located above the storage capacitor electrode 126. Light leakage from the reverse tilt domain 154 is therefore effectively prevented by the storage capacitor electrode 126. In the liquid crystal display device of this embodiment, this makes it possible to minimize the line width of the storage capacitor electrode 126 and maintain a high aperture ratio.

EXAMPLE 6

Figure 22:
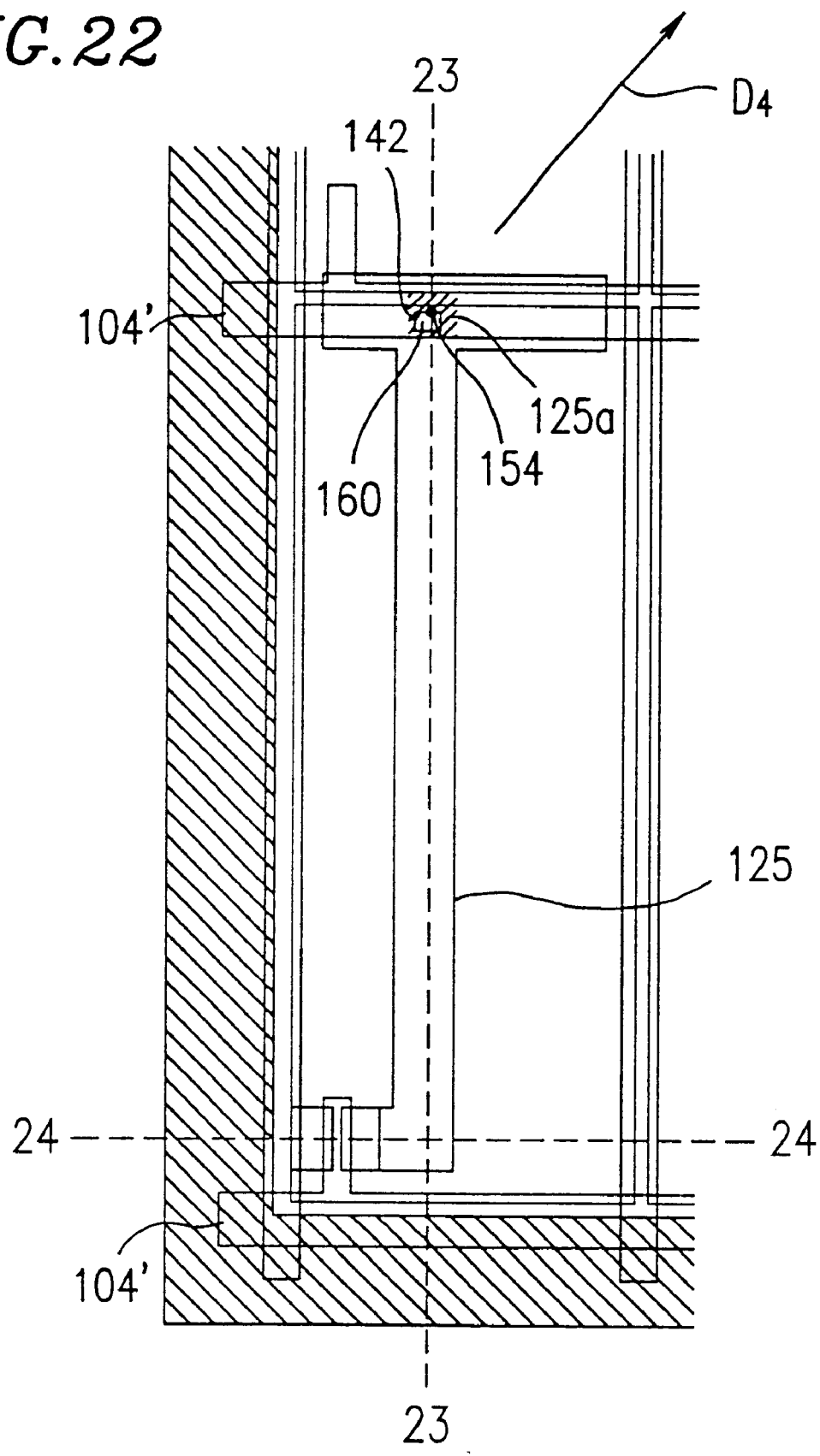
FIG. 22 is a plan view of one pixel of a liquid crystal display device of still another embodiment according to the present invention.
Figure 23:
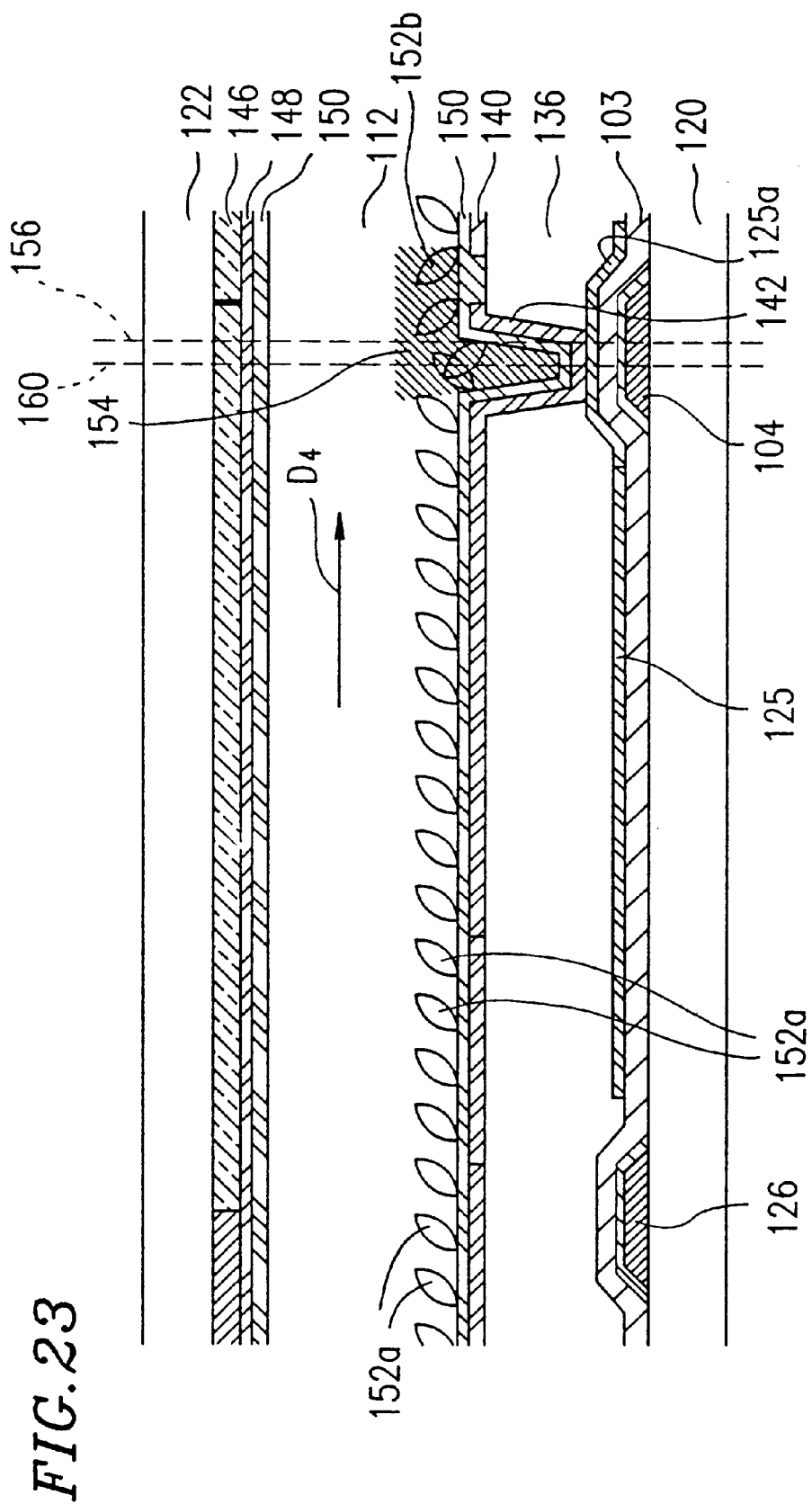
FIG. 23 is a sectional view of the liquid crystal display device, taken along line 23—23 of FIG. 22.
Figure 24:
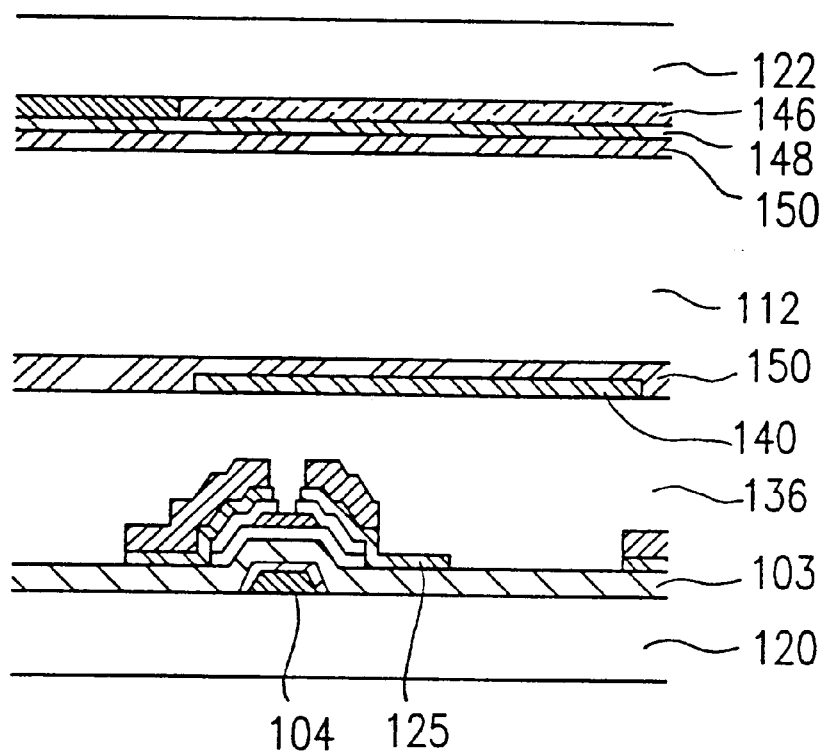
FIG. 24 is a sectional view of the liquid crystal display device, taken along line 24—24 of FIG. 22.

FIG. 22 is a plan view of one pixel of a liquid crystal display device of still another embodiment according to the present invention. FIG. 23 is a sectional view taken along line 23—13 of FIG. 22, and FIG. 24 is a sectional view taken along line 24—24 of FIG. 22.

In this embodiment, an orientation direction $D_4$ of liquid crystal molecules 152a of a liquid crystal layer 112 is opposite to the orientation direction $D_3$ in the liquid crystal display device of Example 4 shown in FIG. 17. As shown in FIG. 22, no storage capacitor electrode is formed, and each gate signal line 104' is made wider than the gate signal line 104 shown in FIG. 17. Each extended drain electrode 125 extends to an adjacent pixel electrode.

As shown in FIG. 23, in the liquid crystal display device of this embodiment, a contact hole 142 is formed on a wide portion 125a of the extended drain electrode 125. However, a center axis 160 of the contact hole 142 is offset from a center axis 156 of the light-shading signal line as the wide portion 125a of the extended drain electrode 125.

In this embodiment, the center axis 160 of the contact hole 142 is preferably offset from the center axis 156 of the light-shading signal line in the orientation direction $D_4$ of the liquid crystal molecules 152a. The distance between the center axes 160 and 156 is the same as that between the center axis 160 of the contact hole and the center axis 156 of the storage capacitor electrode described in Example 4. The reverse tilt domain 154 is generated at a position where the center thereof is offset from the center axis 160 of the contact hole 142 in the direction opposite to the orientation direction $D_4$ of the liquid crystal molecules 152a. Thus, the generated reverse tilt domain 154 is located above the light-shading wide portion 125a of the extended drain electrode 125. Light leakage from the reverse tilt domain 154 is therefore effectively prevented by the wide portion 125a of the extended drain electrode 125. In the liquid crystal display device of this embodiment, this makes it possible to minimize the line width of the wide portion 125a of the extended drain electrode 125 and maintain a high aperture ratio.

EXAMPLE 7

Figure 25:
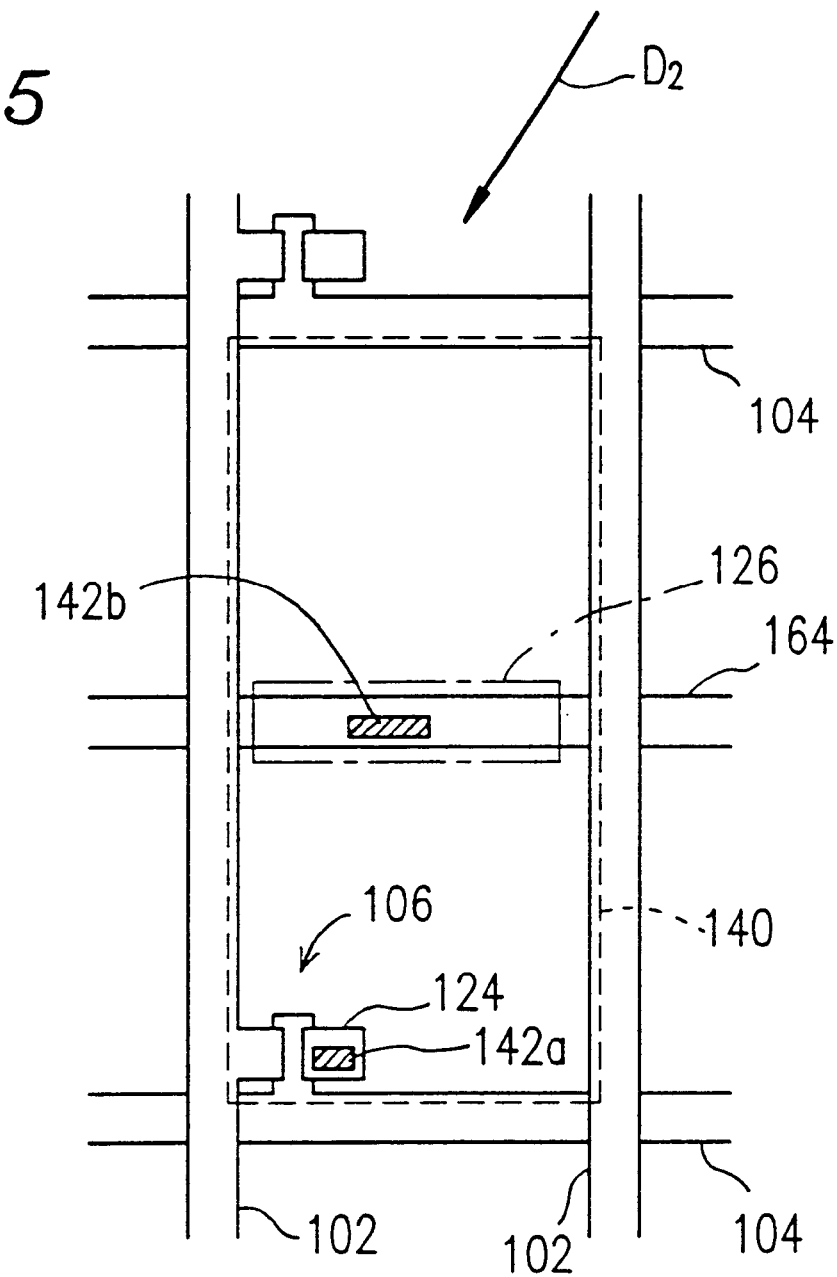
FIG. 25 is a plan view of one pixel of a liquid crystal display device of still another embodiment according to the present invention.
Figure 26:
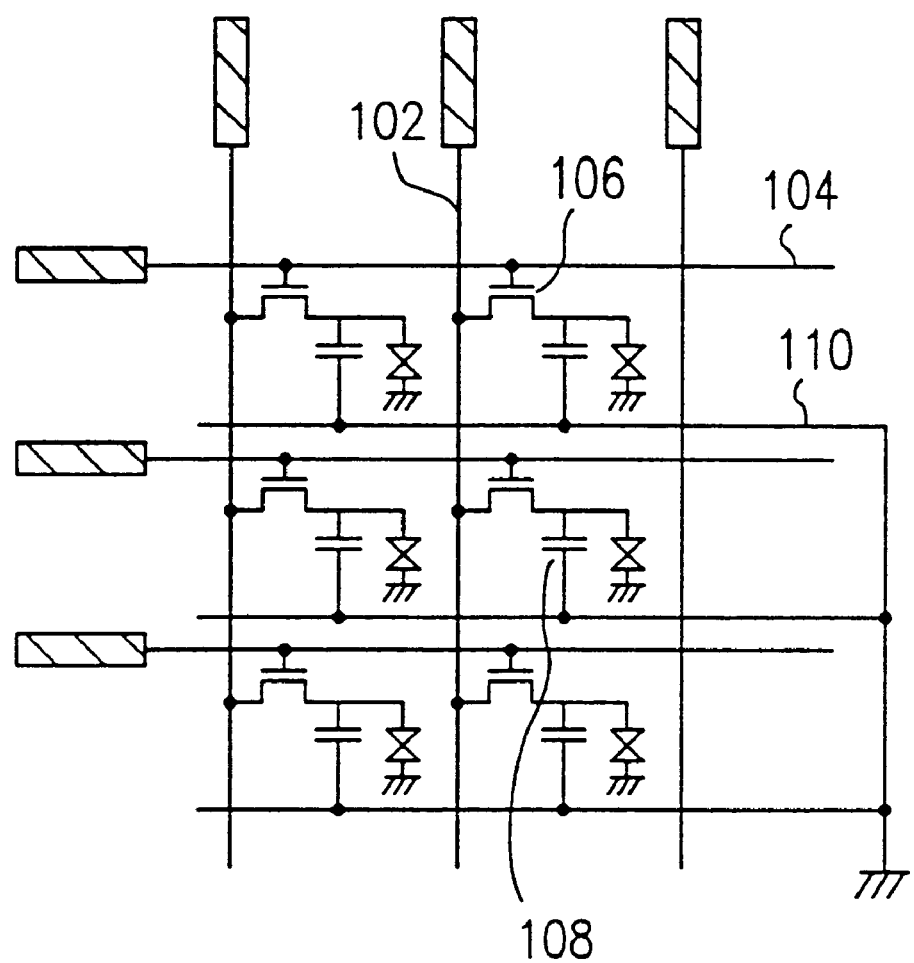
FIG. 26 is an equivalent circuit diagram of a conventional active matrix substrate.
Figure 27:
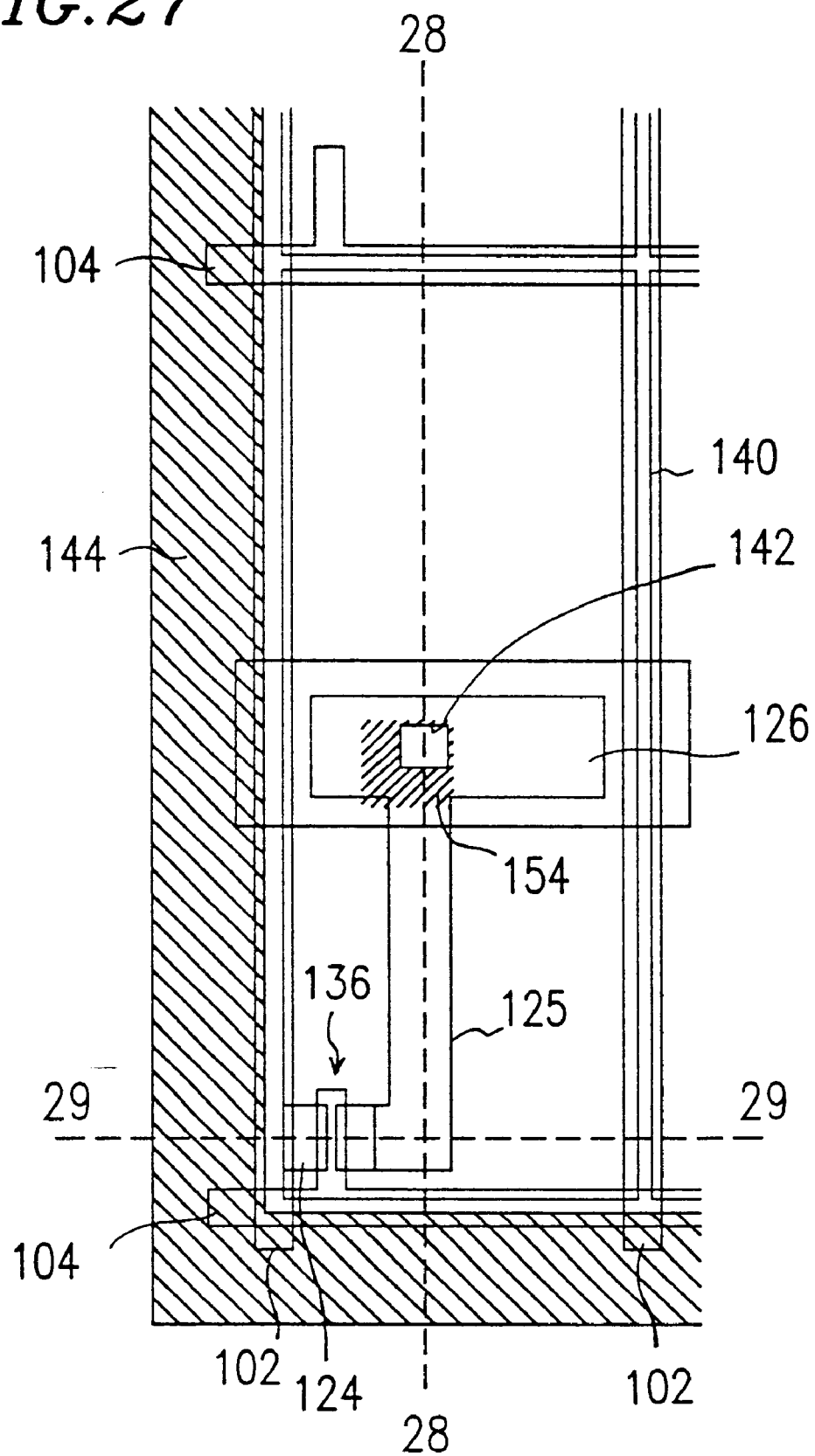
FIG. 27 is a plan view of one pixel of a conventional liquid crystal display device.
Figure 28:
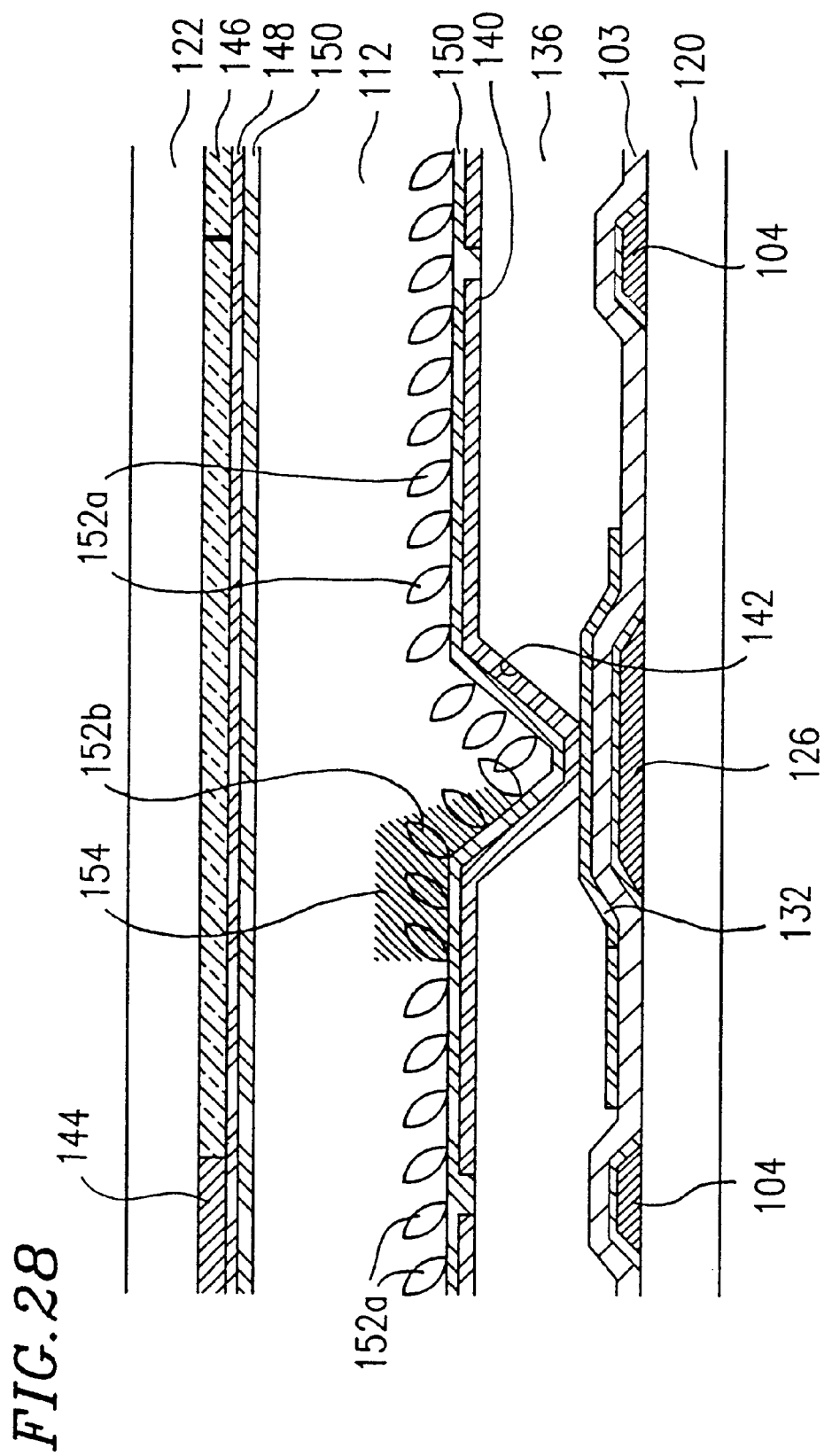
FIG. 28 is a sectional view of the conventional liquid crystal display device, taken along line 28—28 of FIG. 27.
Figure 29:
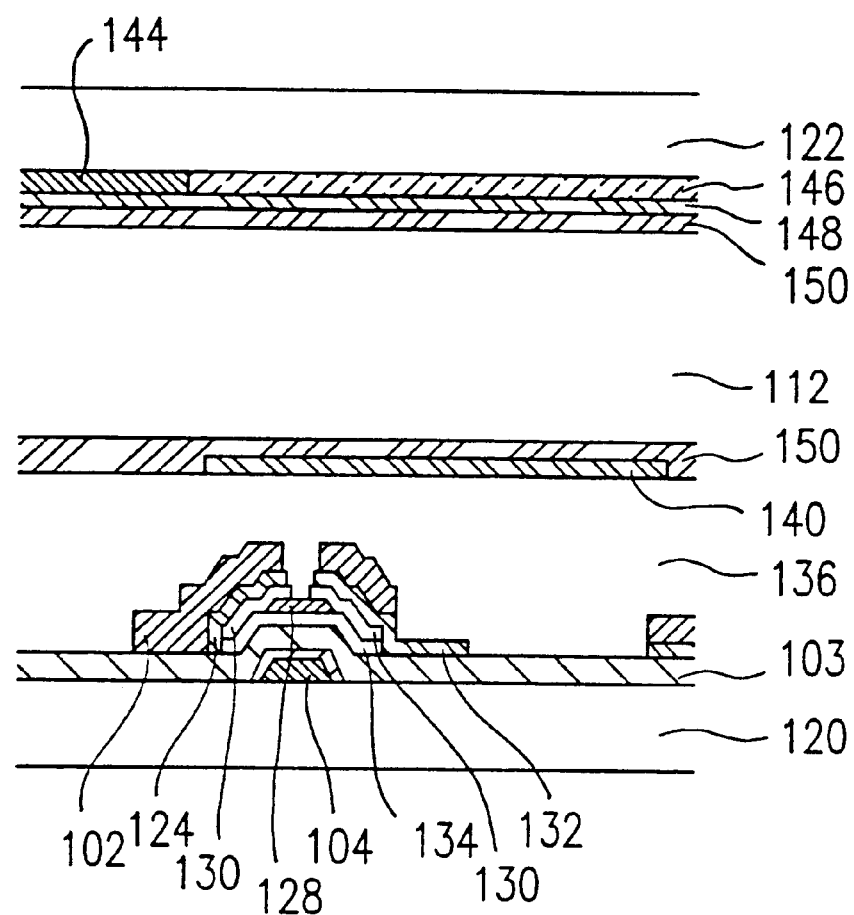
FIG. 29 is a sectional view of the conventional liquid crystal display device, taken along line 29—29 of FIG. 27.
Figure 30A:
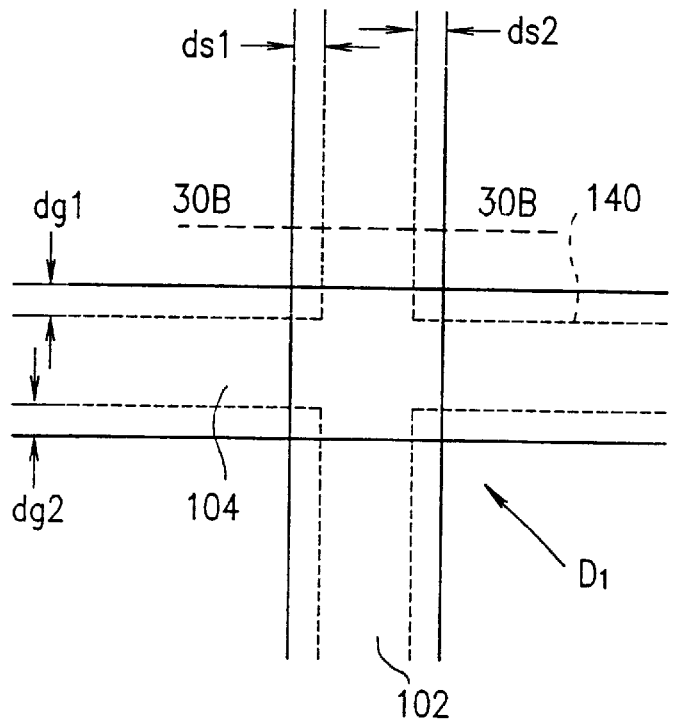
FIG. 30A is an enlarged plan view of a region of a conventional liquid crystal display device where a gate signal line and a source signal line cross each other.
Figure 30B:
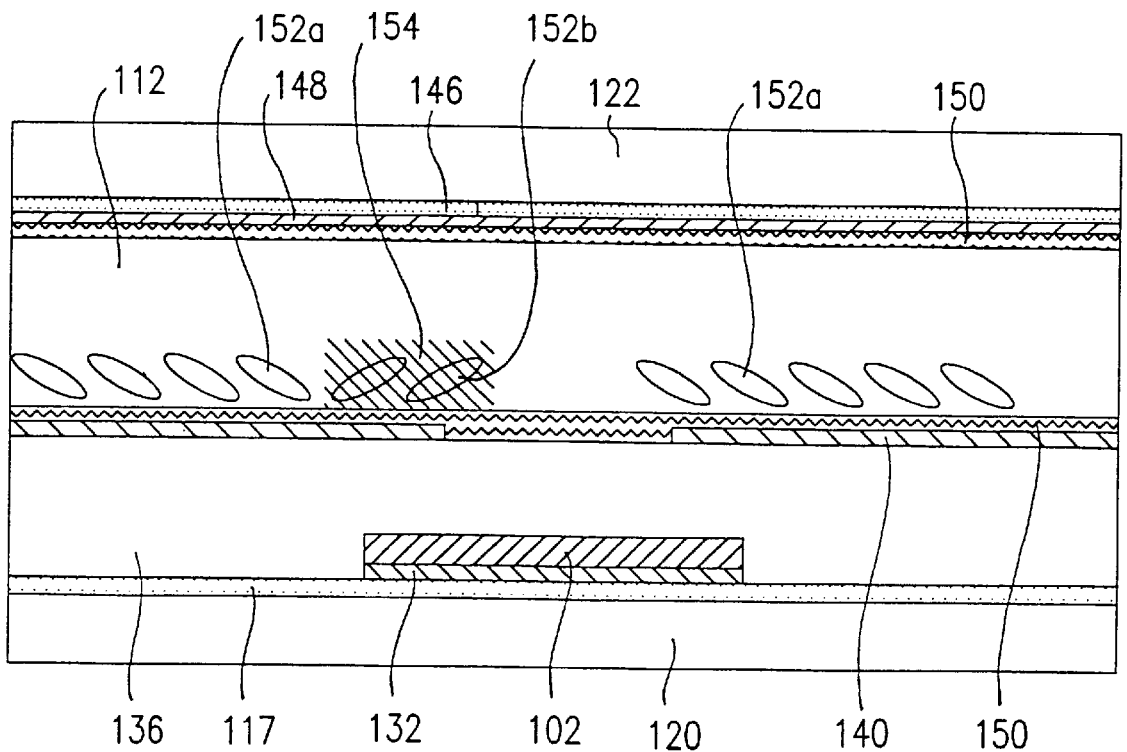
FIG. 30B is a sectional view taken along line 30B—30B of FIG. 30A.
Figure 31A:
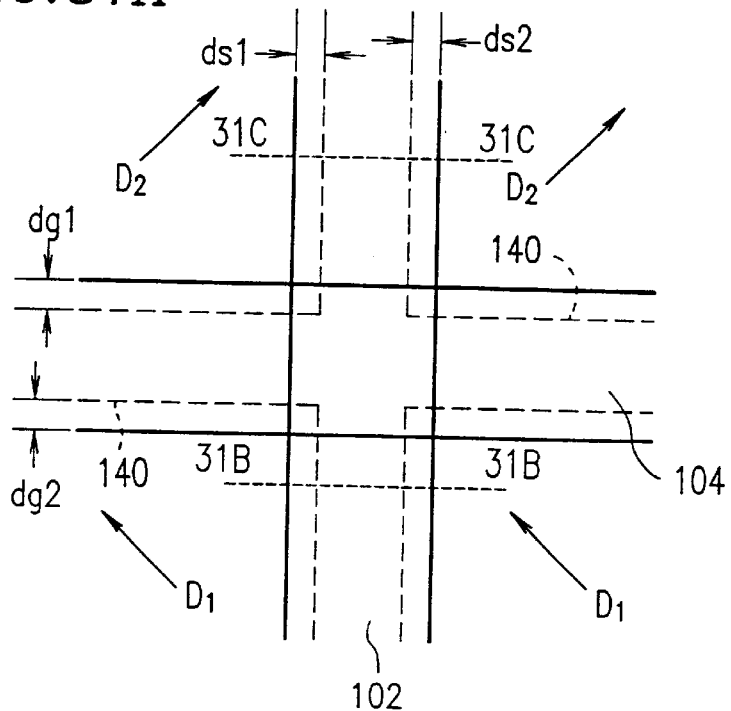
FIG. 31A is an enlarged plan view of a region of a conventional liquid crystal display device where a gate signal line and a source signal line cross each other.
Figure 31B:
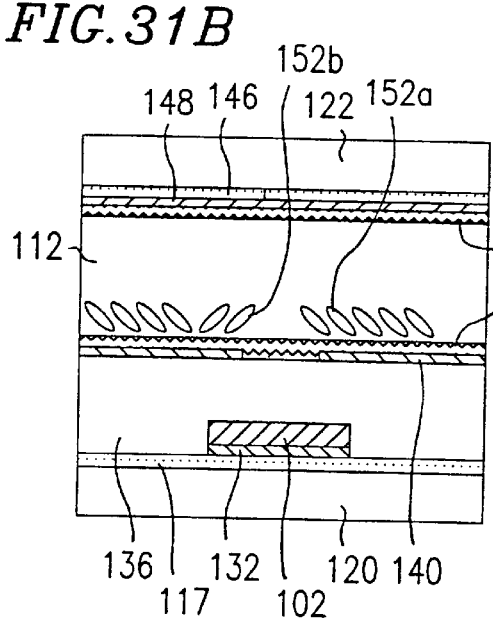
FIG. 31B is a sectional view taken along line 31B—31B of FIG. 31A.
Figure 31C:
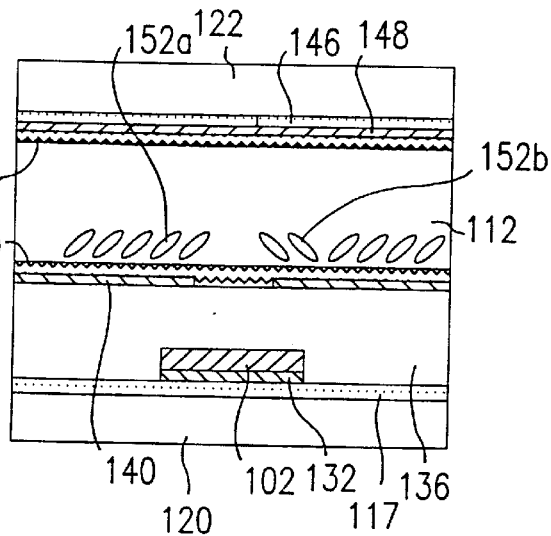
FIG. 31C is a sectional view taken along line 31C—31C of FIG. 31A.

FIG. 25 is a plan view of one pixel of a liquid crystal display device of still another embodiment according to the present invention.

In this embodiment, gate signal lines 104 and storage capacitor electrodes 164 are formed on a transparent substrate (not shown). A gate insulating film (not shown) is formed on these signal lines, and TFTs 106, source signal lines 102, and storage capacitor electrodes 126, an interlayer insulating film (not shown), and pixel electrodes 140 are formed in this order on the gate insulating film.

A light-shading drain electrode 124 of each TFT 106 is connected to the corresponding pixel electrode 140 via a contact hole 142a formed through the interlayer insulating film. Each light-shading storage capacitor electrode 126 is connected to the corresponding pixel electrode 140 via a contact hole 142b formed through the interlayer insulating film.

The center axis of the contact hole 142a is offset from the center axis of the drain electrode 124 of the TFT 106 (the center axis of the light-shading signal line) in an orientation direction $D_4$ of liquid crystal molecules. Thus, a reverse tilt domain generated due to the existence of the contact hole 142a is located above the drain electrode 124, so that light leakage from such a reverse tilt domain is effectively prevented. Like-wise, the center axis of the contact hole 142b is offset from the center axis of the storage capacitor electrode 126 in an orientation direction $D_4$ of liquid crystal molecules. Thus, a reverse tilt domain generated due to the existence of the contact hole 142b is located above the storage capacitor electrode 126, so that light leakage from such a reverse tilt domain is effectively prevented.

In Examples 4 to 7 above, various alterations of the present invention are possible. For example, reverse tilt domains generated due to concave portions of the alignment film formed by the inner wall inclination of the contact holes were described. The present invention is also applicable to reverse tilt domains generated due to concave portions of the alignment film formed by electrodes and TFTs. The embodiments in Examples 4 to 7 are applicable not only to the transparent liquid crystal display devices, but also reflective liquid crystal display devices. In the case of reflective liquid crystal display devices, a light-shading film is formed on the side of a substrate which transmits light.

The liquid crystal display device according to the present invention which has a high aperture ratio is especially useful as a relatively small liquid crystal display device used for a view finder of a video camera and a projector.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: gate signal lines; source signal lines crossing the gate signal lines; an interlayer insulating film formed on the gate signal lines and the source signal lines; and pixel electrodes formed on the interlayer insulating film, the liquid crystal display device further comprising:

a first pixel electrode; and a second pixel electrode having at least a region adjacent to the first pixel electrode, wherein a gate signal line is between the entire adjacent region of the first pixel electrode and the second pixel electrode, the first pixel electrode partially overlaps one side of the gate signal line by an overlap width dg1, and the second pixel electrode partially overlaps the other side of the gate signal line by an overlap width dg2, wherein the magnitude of dg1 is different than the magnitude of dg2, and dg1 and dg2 are uniform for the entire length of the respective overlapping portions.

2. A liquid crystal display device according to claim 1, wherein the first pixel electrode is located downstream of a direction of a pretilt angle of liquid crystal molecules with respect to the gate signal line and the second pixel electrode is located upstream of the direction of the pretilt angle of liquid crystal molecules, and the overlap width of the first pixel electrode on the gate signal line is larger than the overlap width of the second pixel electrode on the gate signal line.

3. A liquid crystal display device according to claim 1, being driven by a gate line inversion driving method.

4. A liquid crystal display device comprising: gate signal lines; source signal lines crossing the gate signal lines; an interlayer insulating film formed on the gate signal lines and the source signal lines; and pixel electrodes formed on the interlayer insulating film, the liquid crystal display device further comprising:

a first pixel electrode; and a second pixel electrode having at least a region adjacent to the first pixel electrode, wherein a source signal line is between the entire adjacent region of the first pixel electrode and the second pixel electrode, the first pixel electrode partially overlaps one side of the source signal line by an overlap width ds1, and the second pixel electrode partially overlaps the other side of the source signal line by an overlap width ds2, wherein the magnitude of ds1 is different than the magnitude of ds2, and ds1 and ds2 are uniform for the entire length of the respective overlapping portions.

5. A liquid crystal display device according to claim 4, wherein the first pixel electrode is located downstream of a direction of a pretilt angle of liquid crystal molecules with respect to the source signal line and the second pixel electrode is located upstream of the direction of the pretilt angle of liquid crystal molecules, and the magnitude of ds1 is larger than the magnitude of ds2.

6. A liquid crystal display device according to claim 4, being driven by a source line inversion driving method.

7. A liquid crystal display device comprising: gate signal lines; source signal lines crossing the gate signal lines; an interlayer insulating film formed on the gate signal lines and the source signal lines; and pixel electrodes formed on the interlayer insulating film, the liquid crystal display device further comprising:

a first pixel electrode;

a second pixel electrode having at least a region adjacent to the first pixel electrode, a third pixel electrode; and a fourth pixel electrode having at least a region adjacent to the third pixel electrode, wherein a gate signal line is between the entire adjacent region of the first pixel electrode and the second pixel electrode, and the first pixel electrode partially overlaps one side of the gate signal line by an overlap width dg1, and the second pixel electrode partially overlaps the other side of the gate signal line by an overlap width dg2, and the magnitude of dg1 is different than the magnitude of dg2, and dg1 and dg2 are uniform for the entire length of the respective overlapping portions, wherein a source signal line is between the entire adjacent region of the third pixel electrode and the fourth pixel electrode, and the third pixel electrode partially overlaps one side of the source signal line by an overlap width ds1, and the fourth pixel electrode partially overlaps the other side of the source signal line by an overlap width ds2, and the magnitude of ds1 is different than the magnitude of ds2.

8. A liquid crystal display device according to claim 7, wherein the first pixel electrode is located downstream of a direction of a pretilt angle of liquid crystal molecules with respect to the gate signal line and the second pixel electrode is located upstream of the direction of the pretilt angle of liquid crystal molecules, and the magnitude of dg1 is larger than the magnitude of dg2, and the third pixel electrode is located downstream of a direction of a pretilt angle of liquid crystal molecules with respect to the source signal line and the fourth pixel electrode is located upstream of the direction of the pretilt angle of liquid crystal molecules, and the magnitude of ds1 is larger than the magnitude of ds2.

9. A liquid crystal display device according to claim 7, being driven by a dot inversion driving method.

10. A liquid crystal display device comprising: gate signal lines; source signal lines crossing the gate signal lines; an interlayer insulating film formed on the gate signal lines and the source signal lines; and pixel electrodes formed on the interlayer insulating film, wherein each of the pixel electrodes has a first region and a second region which are adjacent to each other and have different orientation directions of liquid crystal molecules, the first region and the second region of each pixel electrode partially overlap at least one signal line of the gate signal line and the source signal line, an overlap width of the first region on the signal line is different from an overlap width of the second region on the signal line, and a boundary of the first region and the second region is covered with a light-shading film which crosses the signal line.

11. A liquid crystal display device according to claim 10, wherein the signal line is the source signal line, the source signal line is located downstream of a direction of a pretilt angle of liquid crystal molecules in the first region, the source signal line is located upstream of the direction of the pretilt angle of liquid crystal molecules in the second region, and the overlap width of the second region on the source signal line is larger than the overlap width of the first region on the source signal line.

12. A liquid crystal display device according to claim 11, wherein the signal line is substantially linear, and an edge of the first region of the pixel electrode overlapping the signal line is offset from an edge of the second region overlapping the signal line.

13. A liquid crystal display device according to claim 11, wherein an end of a portion of the signal line which is overlapped by the first region is offset from an end of a portion of the signal line which is overlapped by the second region, and an edge of the first region overlapping the signal line is aligned with an edge of the second region overlapping the signal line.

14. A liquid crystal display device according to claim 10, being driven by a source line inversion driving method or a dot inversion driving method.

15. A liquid crystal display device comprising: storage capacitor electrodes; gate signal lines; source signal lines crossing the storage capacitor electrodes; and interlayer insulating film formed on the gate signal lines and the source signal lines; and pixel electrodes formed on the interlayer insulating film, the liquid crystal display device further comprising:

a first pixel electrode; and a second pixel electrode having at least a region adjacent to the first pixel electrode, wherein a source signal line is between the entire adjacent region of the first pixel electrode and the second pixel electrode and the first and second pixel electrodes are divided into two regions along a line corresponding to the storage capacitor electrode such that each region has a different orientation direction of liquid crystal molecules, the first pixel electrode partially overlaps one side of the source signal line by an overlap width d1 in the first region, and the second pixel electrode partially overlaps the other side of the source signal line by an overlap width d2 in the first region, wherein the magnitude of d1 is different than the magnitude of d2, and the first pixel electrode partially overlaps one side of the source signal line by an overlap width d4 in the second region, and the second pixel electrode partially overlaps the other side of the source signal line by an overlap width d3 in the second region, wherein the magnitude of d3 is different than the magnitude of d4.

16. A liquid crystal display device according to claim 15, being driven by a dot inversion driving method.

17. A liquid crystal display device according to claim 15, being driven by a source line inversion driving method.

* * * * *